(12) United States Patent
Iwanaga et al.

(10) Patent No.: US 6,710,569 B2
(45) Date of Patent: Mar. 23, 2004

(54) MOTOR DRIVING DEVICE AND MOTOR DRIVING METHOD

(75) Inventors: Taishi Iwanaga, Kyoto (JP); Yasunori Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/367,820

(22) Filed: Feb. 19, 2003

(65) Prior Publication Data

US 2003/0155880 A1 Aug. 21, 2003

(30) Foreign Application Priority Data

Feb. 20, 2002 (JP) .................................. 2002-042779

(51) Int. Cl.[7] ............................................ H02P 3/08
(52) U.S. Cl. ................... 318/599; 318/254; 318/811; 318/432; 318/434; 318/439; 318/138
(58) Field of Search ................... 318/254, 138, 318/439, 432, 434, 599, 811, 632

(56) References Cited

U.S. PATENT DOCUMENTS

| | | | | |
|---|---|---|---|---|
| 4,928,043 A | * | 5/1990 | Plunkett | 318/254 |
| 5,517,095 A | * | 5/1996 | Carobolante et al. | 318/254 |
| 5,949,203 A | * | 9/1999 | Buthker | 318/254 |
| 6,111,372 A | * | 8/2000 | Nishimura | 318/254 |

FOREIGN PATENT DOCUMENTS

JP          11-235079          8/1999

OTHER PUBLICATIONS

Specification and drawings for related U.S. patent application Ser. No. 10/307,986.

* cited by examiner

*Primary Examiner*—Rina I Duda
(74) *Attorney, Agent, or Firm*—McDermott, Will & Emery

(57) ABSTRACT

The present invention provides a motor driving device that produces a first PWM control signal and a second PWM control signal according respectively to different torque command signals for energizing motor coils of a plurality of phases with PWM control in parallel, wherein it is possible to avoid a situation where two-phase simultaneous energization continues for a long period of time. For this purpose, a PWM control section unconditionally turns OFF the first and second PWM control signals according to a first reset pulse signal and a second reset pulse signal, respectively, produced by an oscillation section. Thus, it is possible to avoid a situation where two phases are energized simultaneously for a long period of time, and to maintain the parallelism of the two phases being energized.

8 Claims, 18 Drawing Sheets

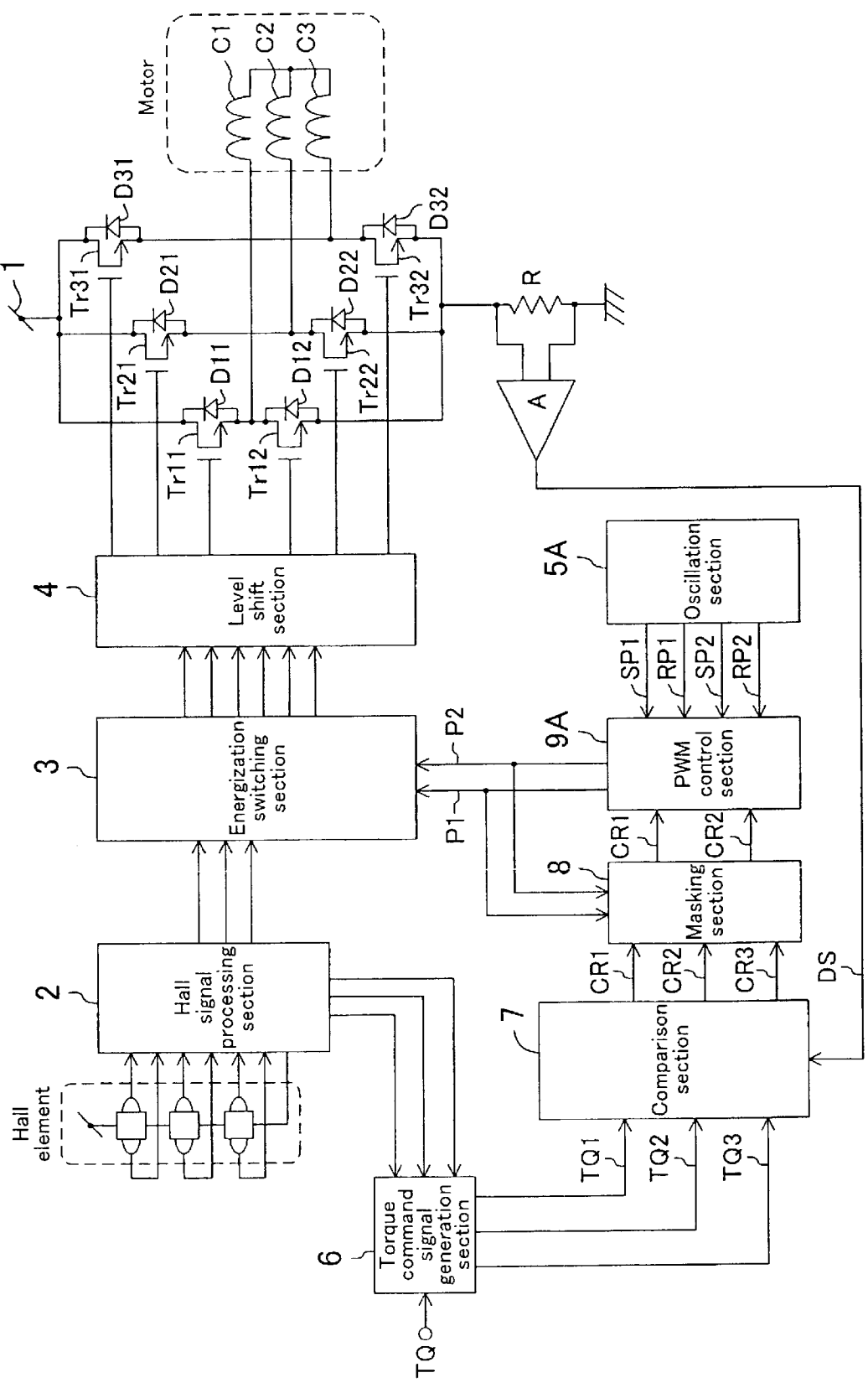

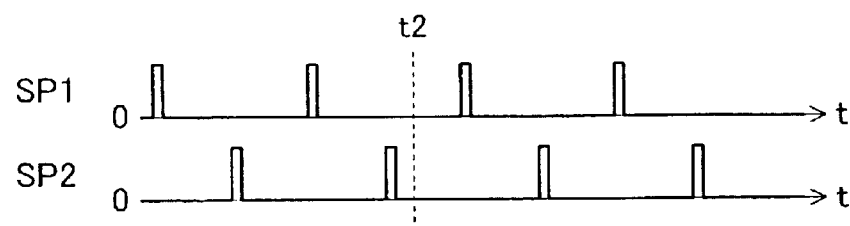
FIG.12A
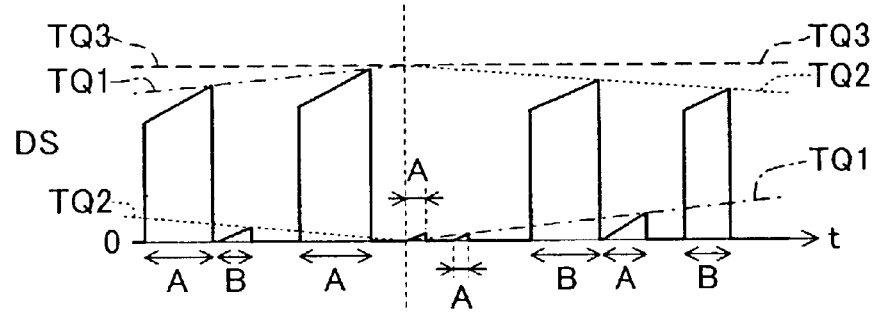
FIG.12B
FIG.12C
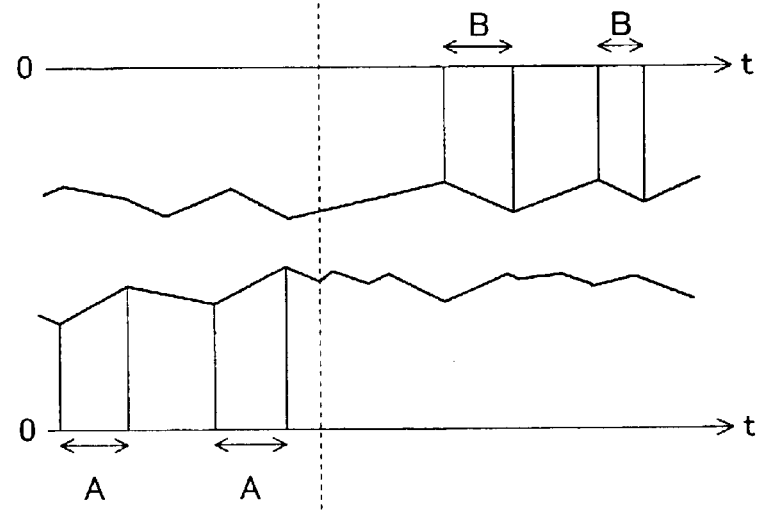
FIG.12D
FIG.12E
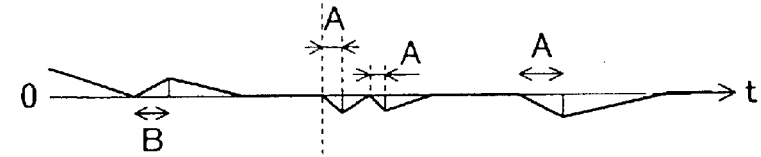
FIG.12F

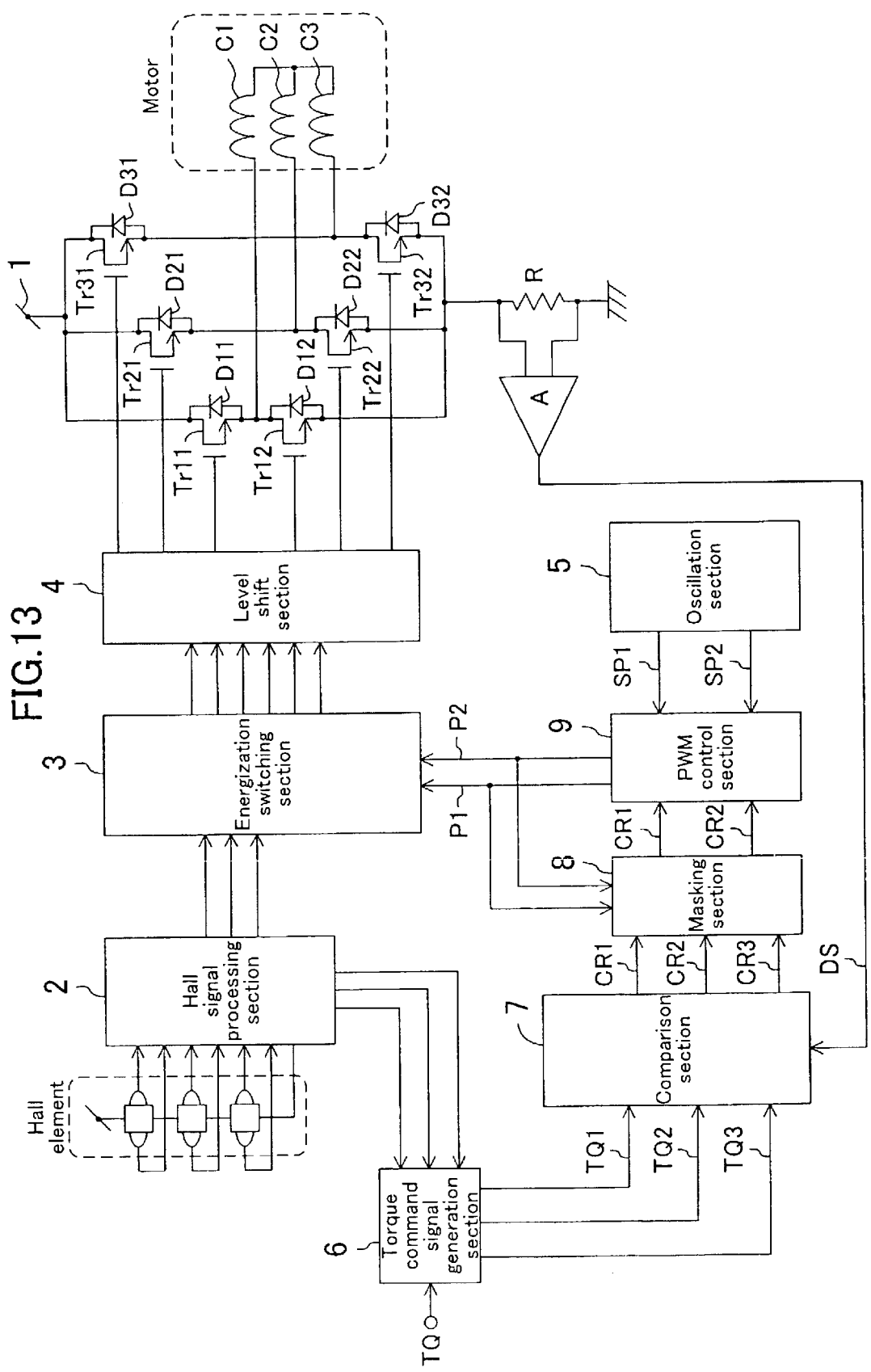

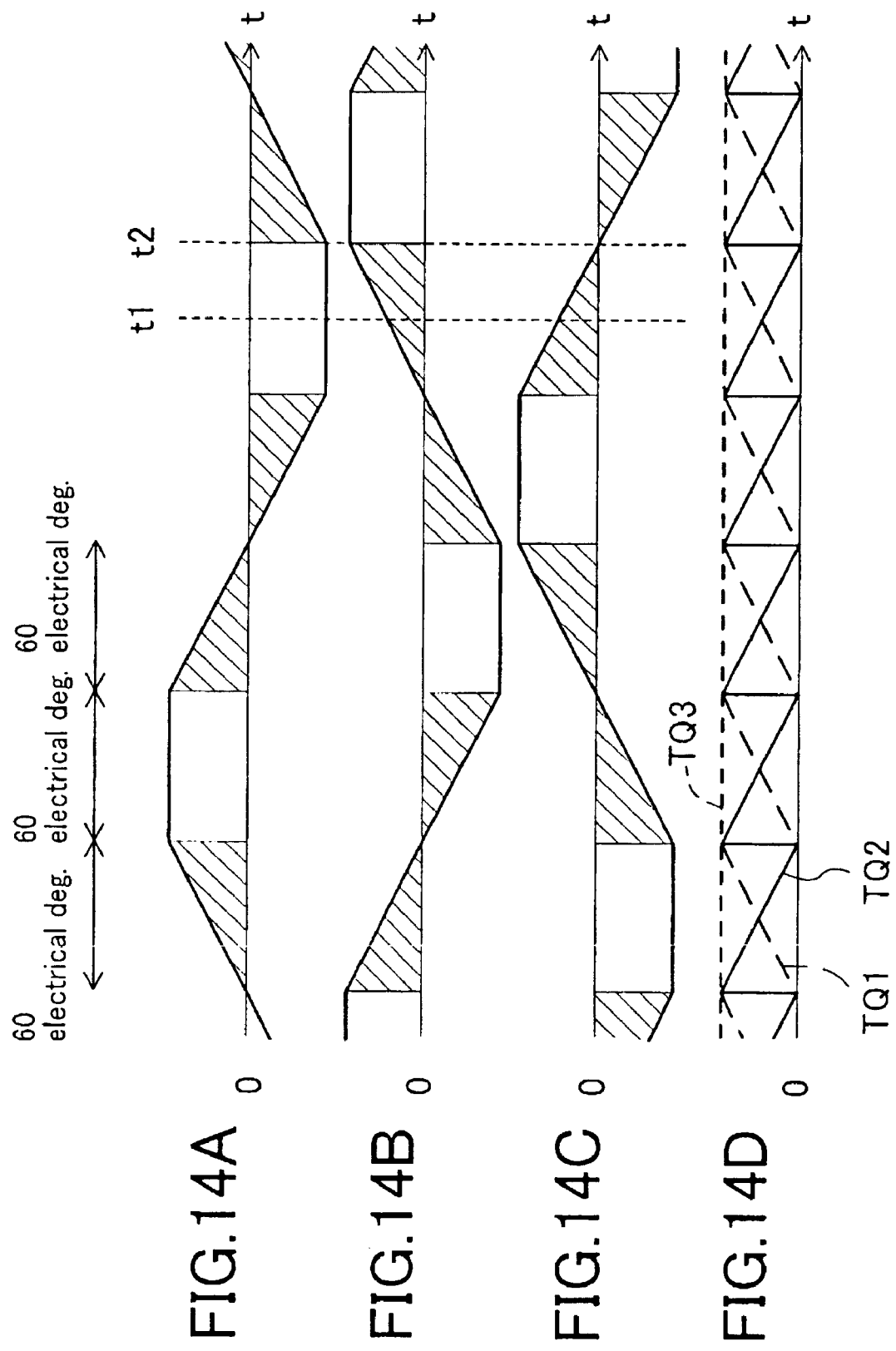

FIG.18C

MOTOR DRIVING DEVICE AND MOTOR DRIVING METHOD

BACKGROUND OF THE INVENTION

The present invention relates to a technique for driving a motor, and more particularly to a technique for driving a PWM-controlled motor.

U.S. patent application Ser. No. 10/307,986 (filed Dec. 3, 2002) by the same inventors as the present application discloses a motor driving device, which is an example of a technique for driving a motor by energizing motor coils of different phases with PWM control in parallel. A motor driving device of FIG. 13, which is one embodiment disclosed in the application, will now be described.

The motor driving device of FIG. 13 drives a three-phase motor (having U phase, V phase and W phase) by energizing the motor coils with PWM control. This motor driving device includes a plurality of transistors Tr11, Tr12, Tr21, Tr22, Tr31 and Tr32 (hereinafter referred to collectively as "Tr") to be switched for appropriately energizing the motor coils, a plurality of diodes D11, D12, D21, D22, D31, D32 (hereinafter referred to collectively as "D") for supplying a regenerative current to the motor coils when the transistors Tr are OFF, a power supply 1 for driving the motor, a Hall signal processing section 2 for producing signals that indicate the rotor position from signals from Hall elements, an energization switching section 3 for switching energized phases at a predetermined cycle, a level shift section 4 for applying the gate voltage of each transistor Tr according to the output from the energization switching section 3, an oscillation section 5 for producing set pulse signals SP1 and SP2, a torque command signal generation section 6 for producing torque command signals TQ1, TQ2 and TQ3 from an original torque command signal TQ, a comparison section 7 for comparing a current detection signal DS with the torque command signals TQ1 to TQ3 to output comparison results CR1, CR2 and CR3, respectively, a masking section 8 for selectively masking or not masking the comparison results CR1 and CR2, and a PWM control section 9 for producing PWM control signals P1 and P2. Note that the current detection signal DS is a signal obtained by amplifying, with an amplifier A, a voltage that is present across the current detection resistor R when the current applied to the motor coil is allowed to flow through the current detection resistor R.

The energization switching section 3 switches the energized phases at a cycle of a period corresponding to 60 electrical degrees in a cycle of a phase current. At the switching, two phases are selected as the energized phases to be energized with PWM control. The remaining one phase is controlled so that the corresponding transistor Tr is fixed to ON for one cycle.

The masking section 8 receives the comparison results CR1 to CR3 from the comparison section 7 and the PWM control signals P1 and P2 from the PWM control section 9 for selectively masking or not masking the comparison results CR1 and CR2 according to the PWM control signals P1 and P2 and the comparison result CR3.

The PWM control section 9 turns ON the PWM control signal P1 according to the set pulse signal SP1, and turns it OFF when detecting, from the comparison result CR1, that the level of the current detection signal DS has reached that of the torque command signal TQ1. Similarly, the PWM control signal P2 is turned ON according to the set pulse signal SP2, and is turned OFF when the PWM control section 9 detects, from the comparison result CR2, that the level of the current detection signal DS has reached that of the torque command signal TQ2.

The operation of the motor driving device of FIG. 13 having such a configuration will now be described with reference to the drawings.

FIG. 14A to FIG. 14C each illustrate a phase current to be applied to a motor coil by the motor driving device of FIG. 13, wherein FIG. 14A illustrates a U-phase current, FIG. 14B illustrates a V-phase current, and FIG. 14C illustrates a W-phase current. Note that each hatched portion in the figures denotes an energized phase to be energized with PWM control, and any other portion denotes an energized phase to be energized while the transistor Tr is fixed to ON.

These phase currents are applied for every 60 electrical degrees according to the torque command signals TQ1 to TQ3 illustrated in FIG. 14D. During a period of 60 electrical degrees, the torque command signal TQ1 keeps increasing, and the torque command signal TQ2 keeps decreasing, with the torque command signal TQ3 being obtained by synthesizing the torque command signal TQ1 with the torque command signal TQ2.

As the energization switching section 3 switches the energized phases at a cycle of a period corresponding to 60 electrical degrees in a cycle of a phase current, the level of each phase current changes as follows. First, in one cycle, the level increases according to the torque command signal TQ1. In the next cycle, the level stays constant according to the torque command signal TQ3. Then, in the following cycle, the level decreases according to the torque command signal TQ2. Then, after the polarity inverts, the level of each phase current undergoes similar transitions. The motor driving device of FIG. 13 drives the motor by using trapezoidal phase currents as illustrated in FIG. 14A to FIG. 14C.

Next, PWM control with the motor driving device of FIG. 13 will be described with reference to the timing charts of FIG. 15A to FIG. 15E, illustrating a portion of FIG. 14A to FIG. 14D around time t1 in an enlarged manner. FIG. 15A illustrates the set pulse signals SP1 and SP2. FIG. 15B illustrates the PWM control signals P1 and P2. FIG. 15C illustrates the torque command signals TQ1 to TQ3 and the current detection signal DS. FIG. 15D and FIG. 15E illustrate the V-phase current and the W-phase current, respectively.

Upon receiving the set pulse signal SP1, the PWM control section 9 turns ON the PWM control signal P1. Thus, the V-phase current is energized (period A in FIG. 15B to FIG. 15D). Then, upon detecting, from the comparison result CR1, that the level of the current detection signal DS has reached that of the torque command signal TQ1, the PWM control section 9 turns OFF the PWM control signal P1. Thus, a regenerative current flows through the V phase (period A' in FIG. 15D). Similarly, upon receiving the set pulse signal SP2, the PWM control section 9 turns ON the PWM control signal P2. Thus, the W-phase current is energized (period B in FIG. 15B, FIG. 15C and FIG. 15E). Then, upon detecting, from the comparison result CR2, that the level of the current detection signal DS has reached that of the torque command signal TQ2, the PWM control section 9 turns OFF the PWM control signal P2. Thus, a regenerative current flows through the W phase (period B' in FIG. 15E).

When the motor driving device of FIG. 13 is driving the motor at a low torque, the ON periods of the PWM control signals P1 and P2 (period A and period B) do not overlap with each other, and the two phases to be PWM-controlled are controlled fully independently. As a result, it is possible to apply trapezoidal phase currents as illustrated in FIG. 14A to FIG. 14C, thereby suppressing vibrations of the motor and thus reducing noise from the motor.

On the other hand, when the motor driving device of FIG. 13 drives the motor at a high torque, the ON periods of the PWM control signals P1 and P2 (period A and period B) overlap with each other.

Next, PWM control when the motor driving device of FIG. 13 drives the motor at a high torque will be described with reference to the timing charts of FIG. 16A to FIG. 16E, illustrating a portion of FIG. 14A to FIG. 14D around time t1 in an enlarged manner. FIG. 16A illustrates the set pulse signals SP1 and SP2. FIG. 16B illustrates the PWM control signals P1 and P2. FIG. 16C illustrates the torque command signals TQ1 to TQ3 and the current detection signal DS. FIG. 16D and FIG. 16E illustrate the V-phase current and the W-phase current, respectively.

Where the ON periods of the PWM control signals P1 and P2 overlap with each other, two phases, i.e., the V phase and the W phase, are energized simultaneously. As a result, the current detection signal DS represents the total amount of current for the two phases being energized simultaneously, as illustrated in FIG. 16C, and the torque command signals TQ1 and TQ2 are no longer proper references for comparison. Therefore, the masking section 8 masks the comparison results CR1 and CR2 so that the PWM control section 9 ignores the comparison results CR1 and CR2 during a period in which the PWM control signals P1 and P2 are both ON. Then, the comparison result CR3 is monitored, and upon detecting, from the comparison result CR3, that the level of the current detection signal DS has reached that of the torque command signal TQ3, either one of the comparison results CR1 and CR2 (the comparison result CR2 in FIG. 16A to FIG. 16E) is unmasked. As a result, either one of the PWM control signals P1 and P2 (the PWM control signal P2 in FIG. 16A to FIG. 16E) is turned OFF by the PWM control section 9, thereby terminating the two-phase simultaneous energization.

Thus, by using the torque command signal TQ3 obtained by synthesizing the torque command signal TQ1 with the torque command signal TQ2, even if two phases to be PWM-controlled are energized simultaneously during a high-torque driving operation of the motor, the two phases can be controlled substantially independently. As a result, energization can be done with trapezoidal waves according to the two torque command signals TQ1 and TQ2, respectively. In this way, even in a high-torque driving operation, it is possible to suppress vibrations of the motor and to reduce noise from the motor.

In the motor driving device of FIG. 13, two phases may not always be energized simultaneously. For example, consider a case where a phase is energized while aiming at the torque command signal TQ1, after the PWM control signal P1 is turned ON. In such a case, if the PWM control section 9 receives the set pulse signal SP2, the PWM control signal P2 is supposed to be turned ON to initiate two-phase simultaneous energization. If, however, the level of the current detection signal DS has increased above the level of the torque command signal TQ2 by the previous energization aiming at the torque command signal TQ1, the PWM control section 9 will not turn ON the PWM control signal P2 based on the comparison result CR2. In such a case, the motor driving device of FIG. 13 fails to energize two phases simultaneously. Therefore, a sufficient electric power cannot be supplied to the motor, thereby resulting in an insufficient torque in the motor, particularly during a high-torque driving operation.

Conversely, if the level of the current detection signal DS does not quickly reach the level of the torque command signal TQ3 in two-phase simultaneous energization, the two-phase simultaneous energization continues for a long period of time. During two-phase simultaneous energization, the energization is performed, aiming not at the individual torque command signals TQ1 and TQ2, but at the total thereof, i.e., the torque command signal TQ3. Therefore, two-phase simultaneous energization continuing for a long period of time not only results in the loss of the parallelism and the independence of the two phases being energized, but also results in the energization of an abnormal phase current.

FIG. 17A to FIG. 17D illustrate how an abnormal phase current occurs when two-phase simultaneous energization continues for a long period of time. FIG. 17A illustrates the set pulse signals SP1 and SP2. FIG. 17B illustrates the current detection signal DS and the torque command signals TQ1 to TQ3. FIG. 17C illustrates a phase current to be energized according to the torque command signal TQ1, and FIG. 17D illustrates a phase current to be energized according to the torque command signal TQ2.

FIG. 17B illustrates a case where after two-phase simultaneous energization is initiated, the level of the current detection signal DS representing the total amount of current does not reach the torque command signal TQ3, whereby the two-phase simultaneous energization continues over a number of cycles of the set pulse signals SP1 and SP2. In such a case, currents that are substantially deviated from the torque command signals TQ1 and TQ2 flow through the energized phases, as illustrated in FIG. 17C and FIG. 17D. If two-phase simultaneous energization continues for a long period of time, the parallelism and the independence of the two phases being energized according to the two PWM control signals P1 and P2 are lost, thereby failing to apply trapezoidal phase currents. This results in vibrations of the motor and noise from the motor.

Furthermore, in the motor driving device of FIG. 13, the timing at which the PWM control signal P1 or P2 is turned ON by the PWM control section 9 may not coincide with the timing at which the energization switching section 3 switches the energized phases, i.e., the start of a block corresponding to 60 electrical degrees in a cycle of a phase current (hereinafter referred to as "block starting point"). In such a case, a distortion may occur in a phase current, or an erroneous phase current may be energized.

FIG. 18A to FIG. 18E are timing charts illustrating a portion of FIG. 14A to FIG. 14D around time t2 in an enlarged manner. Note that time t2 is a block starting point at which energized phases are switched by the energization switching section 3. FIG. 18A illustrates the set pulse signals SP1 and SP2. FIG. 18B illustrates the current detection signal DS and the torque command signals TQ1 to TQ3. FIG. 18C, FIG. 18D and FIG. 18E illustrate the U-phase current, the V-phase current and the W-phase current, respectively.

In FIG. 18A to FIG. 18E, before time t2, the U-phase current is the total current of the V-phase current and the W-phase current, the V-phase current is energized while aiming at the torque command signal TQ1, and the W-phase current is energized while aiming at the torque command signal TQ2. Then, after time t2, the U-phase current is energized while aiming at the torque command signal TQ2, the V-phase current is the total current of the U-phase current and the W-phase current, and the W-phase current is energized while aiming at the torque command signal TQ1.

As illustrated in FIG. 18A to FIG. 18E, if the block starting point does not coincide with the set pulse signal SP1 or SP2, a new energized phase cannot be energized until a new set pulse signal SP1 or SP2 is received after the start of a new block of 60 electrical degrees. Therefore, the period for which a regenerative current flows increases, thereby resulting in a distortion in a phase current as indicated by arrows in FIG. 18C and FIG. 18D. Moreover, even after the energized phases are switched, the energized state of the previous cycle remains, whereby an erroneous energized phase may be energized. These factors may result in vibrations of the motor or noise from the motor.

SUMMARY OF THE INVENTION

The present invention has been made in view of the above, and has an object to further suppress vibrations of a motor and to reduce noise from the motor while giving a sufficient torque to the motor, with a motor driving device as illustrated in FIG. 13, for example. More specifically, it is an object of the present invention to ensure that two phases are energized simultaneously during a high-torque driving operation of the motor, while avoiding two-phase simultaneous energization continuing for a long period of time. It is also an object of the present invention to eliminate a distortion in a phase current due to a shift between a block starting point and the start of energization.

In order to achieve the object set forth above, the present invention provides a motor driving device for driving a motor by energizing motor coils with PWM control, the motor driving device including: an energization switching section for determining a first energized phase and a second energized phase to be PWM-controlled, the determination being made at a predetermined cycle; a torque command signal generation section that receives an original torque command signal for producing a first torque command signal and a second torque command signal each having an amplitude according to the original torque command signal, and also producing a third torque command signal, which is obtained by synthesizing the first and second torque command signals together; a comparison section that receives the first to third torque command signals and a current detection signal, which is obtained by detecting a current being supplied to the motor, for comparing the current detection signal with the first to third torque command signals to output a first comparison result, a second comparison result, and a third comparison result, respectively; an oscillation section for producing a first set pulse signal and a second set pulse signal; a PWM control section that receives the first and second set pulse signals and the first and second comparison results for producing a first PWM control signal that is turned ON according to the first set pulse signal and turned OFF according to the first comparison result, and also producing a second PWM control signal that is turned ON according to the second set pulse signal and turned OFF according to the second comparison result; and a masking section that receives the first and second PWM control signals and the first to third comparison results for selectively masking or not masking the first and second comparison results according to the first and second PWM control signals and the third comparison result, wherein: the masking section receives the first and second set pulse signals so as to mask the first comparison result according to the first set pulse signal and mask the second comparison result according to the second set pulse signal; and the motor driving device energizes the first and second energized phases with PWM control in parallel according respectively to the first and second PWM control signals.

With the motor driving device of the present invention, in a case where the first (or second) energized phase is energized according to the first (or second) PWM control signal, when the PWM control section receives the second (or first) set pulse signal, the second (or first) comparison result is masked by the masking section so as to be invalidated, whereby even if the level of the current detection signal at this point is equal to or greater than that of the second (or first) torque command signal, the PWM control section can reliably turn ON the second (or first) PWM control signal, without being influenced by the second (or first) comparison result. Therefore, in addition to the first (or second) phase current, the second (or first) phase current can be energized.

The present invention provides another motor driving device for driving a motor by energizing motor coils with PWM control, the motor driving device including: an energization switching section for determining a first energized phase and a second energized phase to be PWM-controlled, the determination being made at a predetermined cycle; a torque command signal generation section that receives an original torque command signal for producing a first torque command signal and a second torque command signal each having an amplitude according to the original torque command signal, and also producing a third torque command signal, which is obtained by synthesizing the first and second torque command signals together; a comparison section that receives the first to third torque command signals and a current detection signal, which is obtained by detecting a current being supplied to the motor, for comparing the current detection signal with the first to third torque command signals to output a first comparison result, a second comparison result, and a third comparison result, respectively; an oscillation section for producing a first set pulse signal and a second set pulse signal; a PWM control section that receives the first and second set pulse signals and the first and second comparison results for producing a first PWM control signal that is turned ON according to the first set pulse signal and turned OFF according to the first comparison result, and also producing a second PWM control signal that is turned ON according to the second set pulse signal and turned OFF according to the second comparison result; and a masking section that receives the first and second PWM control signals and the first to third comparison results for selectively masking or not masking the first and second comparison results according to the first and second PWM control signals and the third comparison result, wherein: the PWM control section receives a first reset pulse signal and a second reset pulse signal, which are externally provided or internally produced, for turning OFF the first PWM control signal according to the first reset pulse signal and turning OFF the second PWM control signal according to the second reset pulse signal; and the motor driving device energizes the first and second energized phases with PWM control in parallel according respectively to the first and second PWM control signals.

With the motor driving device of the present invention, the PWM control section unconditionally turns OFF the first (or second) PWM control signal according to the first (or second) reset pulse signal, whereby the energization of the first (or second) energized phase can be discontinued unconditionally. Thus, it is possible to avoid a situation where two-phase simultaneous energization continues for a long period of time.

It is preferred that: the masking section masks the first and second comparison results during a period in which the first and second PWM control signals are both ON; and during said period, the second comparison result is kept masked for a predetermined period of time and then unmasked according to the first reset pulse signal, and the first comparison result is kept masked for a predetermined period of time and then unmasked according to the second reset pulse signal.

In this way, while the first and second PWM control signals are both ON, i.e., during two-phase simultaneous energization, the PWM control section unconditionally turns OFF the first (or second) PWM control signal, and the masking section unmasks the first (or second) comparison result, according to the first (or second) reset pulse signal, whereby it is possible to erroneously turn OFF also the second (or first) PWM control signal when terminating the two-phase simultaneous energization.

Immediately after the first (or second) PWM control signal is turned OFF during two-phase simultaneous energization, the current detection signal may temporarily indicate a level as high as that during two-phase simultaneous energization, and the level of the current detection signal may have already reached that of the second torque command signal. In view of this, the second (or first) comparison result is kept masked until the current detection signal settles to a proper level after the first (or second) PWM control signal is turned OFF according to the first (or second) reset pulse signal, thereby preventing the second (or first) PWM control signal from being turned OFF erroneously.

The present invention provides another motor driving device for driving a motor by energizing motor coils with PWM control, the motor driving device including: an energization switching section for determining a first energized phase and a second energized phase to be PWM-controlled, the determination being made at a predetermined cycle; a torque command signal generation section that receives an original torque command signal for producing a first torque command signal and a second torque command signal each having an amplitude according to the original torque command signal; a comparison section that receives the first and second torque command signals and a current detection signal, which is obtained by detecting a current being supplied to the motor, for comparing the current detection signal with the first and second torque command signals to output a first comparison result and a second comparison result, respectively; an oscillation section for producing a first set pulse signal and a second set pulse signal; and a PWM control section that receives the first and second set pulse signals and the first and second comparison results for producing a first PWM control signal that is turned ON according to the first set pulse signal and turned OFF according to the first comparison result, and also producing a second PWM control signal that is turned ON according to the second set pulse signal and turned OFF according to the second comparison result, wherein the first and second energized phases are energized with PWM control in parallel according respectively to the first and second PWM control signals so that a start of the predetermined cycle coincides with a timing at which the first or second PWM control signal is turned ON.

With the motor driving device of the present invention, the start of the predetermined cycle, at which the energization switching section is operated, i.e., the timing at which new first and second energized phases are determined, coincides with the timing at which the first or second PWM control signal is turned ON, whereby energization of the first or second energized phase can be started quickly after the first and second energized phases are determined by the energization switching section. Thus, it is possible to eliminate a distortion in a phase current due to a delay in the initiation of the energization at the start of the predetermined cycle, at which the energization switching section is operated, and to prevent an erroneous energized phase from being energized.

It is preferred that the energization switching section receives the first or second set pulse signal for making the start of the predetermined cycle coincide with a timing at which the first or second set pulse signal is turned ON.

It is preferred that: the energization switching section produces a signal indicating a start of the predetermined cycle; and the PWM control section receives the signal indicating the start of the predetermined cycle for turning ON the first or second PWM control signal according to the signal indicating the start of the predetermined cycle.

In order to achieve the object set forth above, the present invention provides a motor driving method for driving a motor by energizing motor coils with PWM control, the motor driving method including: an energization switching step of determining a first energized phase and a second energized phase to be PWM-controlled, the determination being made at a predetermined cycle; a torque command signal generation step of producing a first torque command signal and a second torque command signal each having an amplitude according to a given original torque command signal, and also producing a third torque command signal, which is obtained by synthesizing the first and second torque command signals together; a comparison step of comparing a current detection signal, which is obtained by detecting a current being supplied to the motor, with the first to third torque command signals; a PWM control step of producing a first PWM control signal and a second PWM control signal according to a given first set pulse signal, a given second set pulse signal and comparison results from the comparison step; and a masking step of selectively masking or not masking the comparison results based on the first and second PWM control signals and the comparison result from the comparison step, wherein: the PWM control step uses a given first reset pulse signal and a given second reset pulse signal for turning OFF the first PWM control signal according to the first reset pulse signal and turning OFF the second PWM control signal according to the second reset pulse signal; and the motor driving method energizes the first and second energized phases with PWM control in parallel according respectively to the first and second PWM control signals.

The present invention provides another motor driving method for driving a motor by energizing motor coils with PWM control, the motor driving method including: an energization switching step of determining a first energized phase and a second energized phase to be PWM-controlled, the determination being made at a predetermined cycle; a torque command signal generation step of producing a first torque command signal and a second torque command signal each having an amplitude according to a given original torque command signal; a comparison step of comparing a current detection signal, which is obtained by detecting a current being supplied to the motor, with the first and second torque command signals; and a PWM control step of producing a first PWM control signal and a second PWM control signal according to a given first set pulse signal, a given second set pulse signal and comparison results from the comparison step, wherein the first and second energized phases are energized with PWM control in parallel according respectively to the first and second PWM control signals so that a start of the predetermined cycle coincides with a timing at which the first or second PWM control signal is turned ON.

BRIEF DESCRIPTION OF THE DRAWINGS

FIG. 3 is a diagram illustrating a configuration of a motor driving device according to a second embodiment of the present invention.

FIG. 12A to FIG. 12F are timing charts for the motor driving device of FIG. 11.

FIG. 13 is a diagram illustrating a configuration of a motor driving device disclosed in U.S. patent application Ser. No. 10/307,986.

FIG. 14A to FIG. 14D illustrate phase currents to be applied by the motor driving device of FIG. 13.

FIG. 18A to FIG. 18E illustrate a distortion in a phase current occurring in the motor driving device of FIG. 13.

DESCRIPTION OF THE PREFERRED EMBODIMENTS

Preferred embodiments of the present invention will now be described with reference to the drawings. Note that in the following description, the set pulse signals SP1 and SP2 correspond respectively to the first and second set pulse signals of the present invention, the torque command signals TQ1 to TQ3 correspond respectively to the first to third torque command signals of the present invention, the comparison results CR1 to CR3 correspond respectively to the first to third comparison results of the present invention, the PWM control signals P1 and P2 correspond respectively to the first and second PWM control signals of the present invention, and reset pulse signals RP1 and RP2 correspond respectively to the first and second reset pulse signals of the present invention.

First Embodiment

Figure 1:
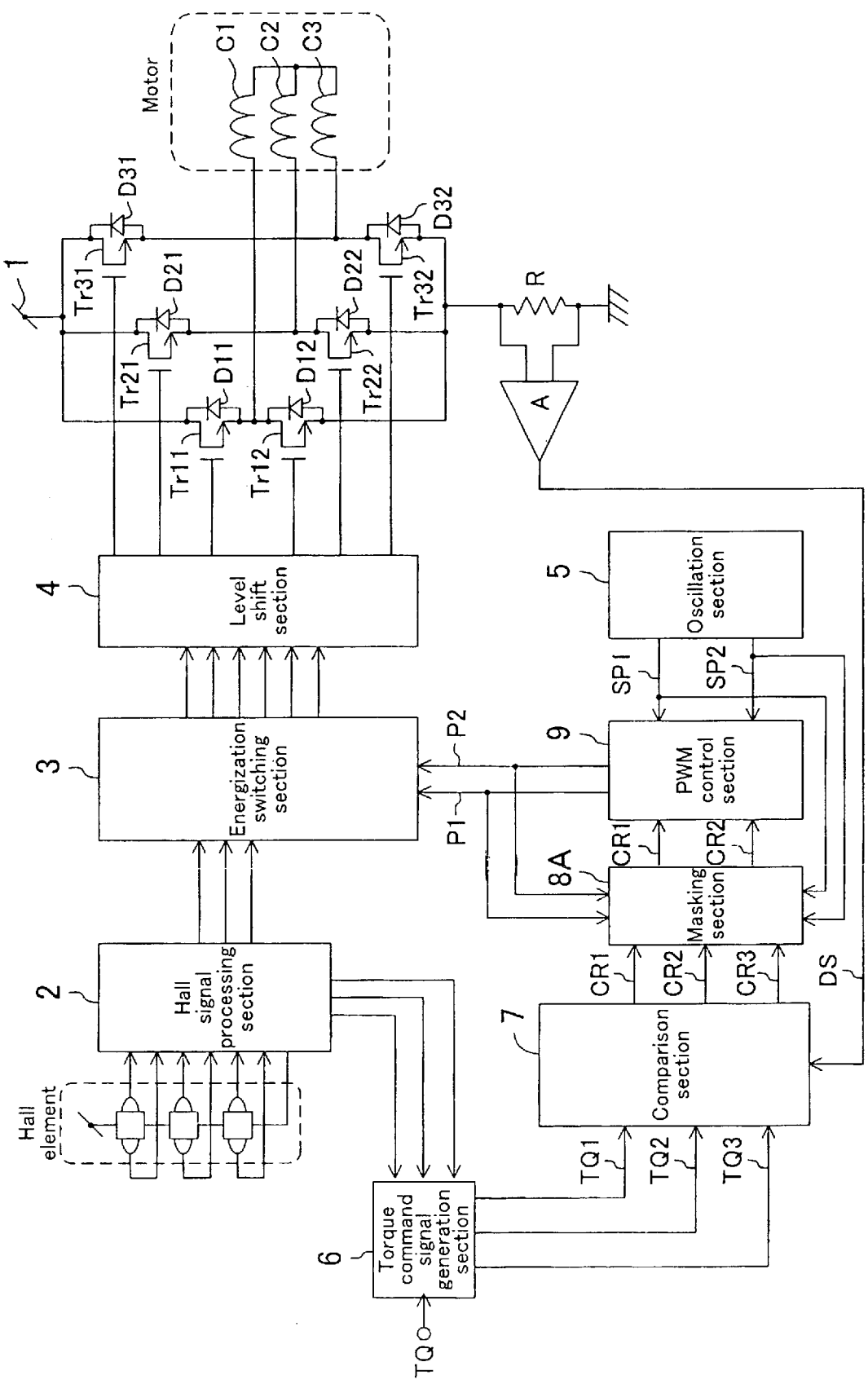
FIG. 1 is a diagram illustrating a configuration of a motor driving device according to a first embodiment of the present invention.

FIG. 1 illustrates a configuration of a motor driving device according to the first embodiment of the present invention.

The motor driving device of the present embodiment includes a masking section 8A having a different configuration from that of the masking section 8 of the motor driving device of FIG. 13. Other than this, the elements of the motor driving device of the present embodiment are similar to those of the motor driving device of FIG. 13, and thus will not be further described below.

The masking section 8A receives the set pulse signals SP1 and SP2 from the oscillation section 5, the comparison results CR1 to CR3 from the comparison section 7, and the PWM control signals P1 and P2 from the PWM control section 9. Based on the received signals, the masking section 8A masks or unmasks the comparison results CR1 and CR2 to output the masked or unmasked the comparison results CR1 and CR2. The operation of masking the comparison results CR1 and CR2 based on the PWM control signals P1 and P2 and the comparison result CR3 is as described above, and will not be further described below. The masking/unmasking operation based on the set pulse signals SP1 and SP2 will now be described with reference to the drawings.

Figure 2A:
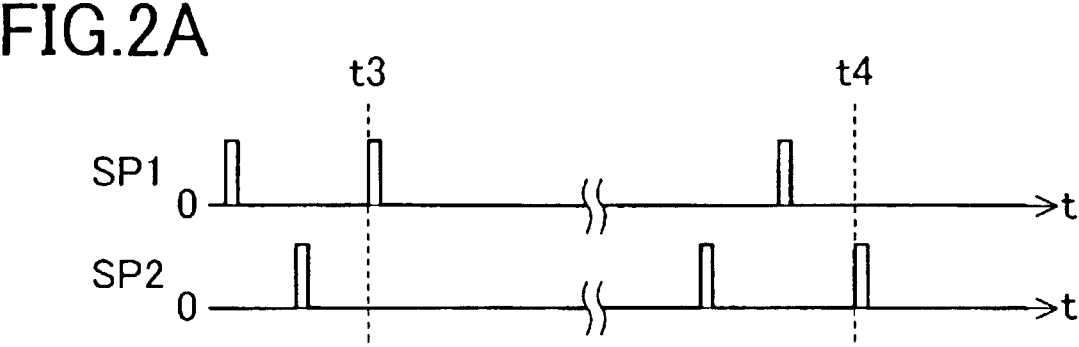
FIG. 2A and FIG. 2B are timing charts for the motor driving device of FIG. 1.
Figure 2B:
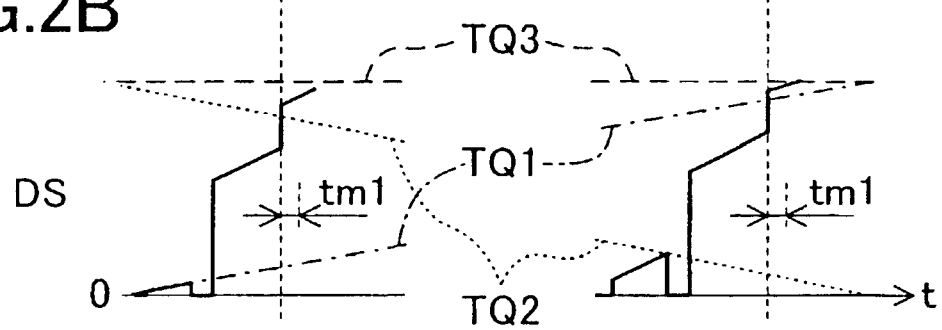

FIG. 2A and FIG. 2B are timing charts of the set pulse signals SP1 and SP2 (FIG. 2A) and the current detection signal DS (FIG. 2B).

Immediately before time t3, a motor coil is energized while aiming at the torque command signal TQ2. At this point, the level of the current detection signal DS is already greater than that of the torque command signal TQ1. Thus, the comparison result CR1 indicates that the level of the current detection signal DS has reached that of the torque command signal TQ1.

At time t3, the PWM control section 9 attempts to turn ON the PWM control signal P1 according to the set pulse signal SP1. At this time, according to the set pulse signal SP1, the masking section 8A masks the comparison result CR1 at least for the period indicated by tm1 so that the PWM control section 9 is not influenced by the comparison result CR1. Thus, the PWM control section 9 can turn ON the PWM control signal P1, thereby initiating two-phase simultaneous energization.

Similarly, immediately before time t4, a motor coil is being energized while aiming at the torque command signal TQ1. At this point, the level of the current detection signal DS is already greater than that of the torque command signal TQ2. Thus, the comparison result CR2 indicates that the level of the current detection signal DS has reached that of the torque command signal TQ2.

At time t4, the PWM control section 9 attempts to turn ON the PWM control signal P2 according to the set pulse signal SP2. At this time, according to the set pulse signal SP2, the masking section 8A masks the comparison result CR2 at least for the period indicated by tm1 so that the PWM control section 9 is not influenced by the comparison result CR2. Thus, the PWM control section 9 can turn ON the PWM control signal P2, thereby initiating two-phase simultaneous energization.

As described above, according to the present embodiment, the PWM control signals P1 and P2 can be turned ON simultaneously, whereby motor coils of two phases can be energized simultaneously. Thus, particularly, during a high-torque driving operation of the motor, a sufficient electric power according to the original torque command signal TQ can be supplied to the motor, thereby solving the problem of the motor torque being insufficient.

Note that the masking section 8A masks the comparison result CR1 (or CR2) at least for the period of tm1 because it is only required to invalidate the comparison result CR1 (or CR2) at least until when the PWM control section 9 reliably turns ON the PWM control signal P1 (or P2) according to the set pulse signal SP1 (or SP2). Therefore, tm1 is preferably about on the order of 100 ns.

Second Embodiment

FIG. 3 illustrates a configuration of a motor driving device according to the second embodiment of the present invention. The motor driving device of the present embodiment includes an oscillation section 5A having a different configuration from that of the oscillation section 5 of the motor driving device of FIG. 13, and a PWM control section 9A having a different configuration from that of the PWM control section 9. Other than this, the elements of the motor driving device of the present embodiment are similar to those of the motor driving device of FIG. 13, and thus will not be further described below.

The oscillation section 5A produces reset pulse signals RP1 and RP2, in addition to the set pulse signals SP1 and SP2. The reset pulse signals RP1 and RP2 are signals for unconditionally turning OFF the PWM control signals P1 and P2, respectively, Herein, it is assumed that the reset pulse signals RP1 and RP2 occur immediately before the set pulse signals SP1 and SP2, respectively.

The PWM control section 9A turns OFF the PWM control signal P1 according to the reset pulse signal RP1, in addition to turning OFF the PWM control signal P1 upon detecting, from the comparison result CR1, that the level of the current detection signal DS has reached that of the torque command signal TQ1. Similarly, the PWM control section 9A turns OFF the PWM control signal P2 according to the reset pulse signal RP2, in addition to turning OFF the PWM control signal P2 upon detecting, from the comparison result CR2, that the level of the current detection signal DS has reached that of the torque command signal TQ2.

Figure 4:
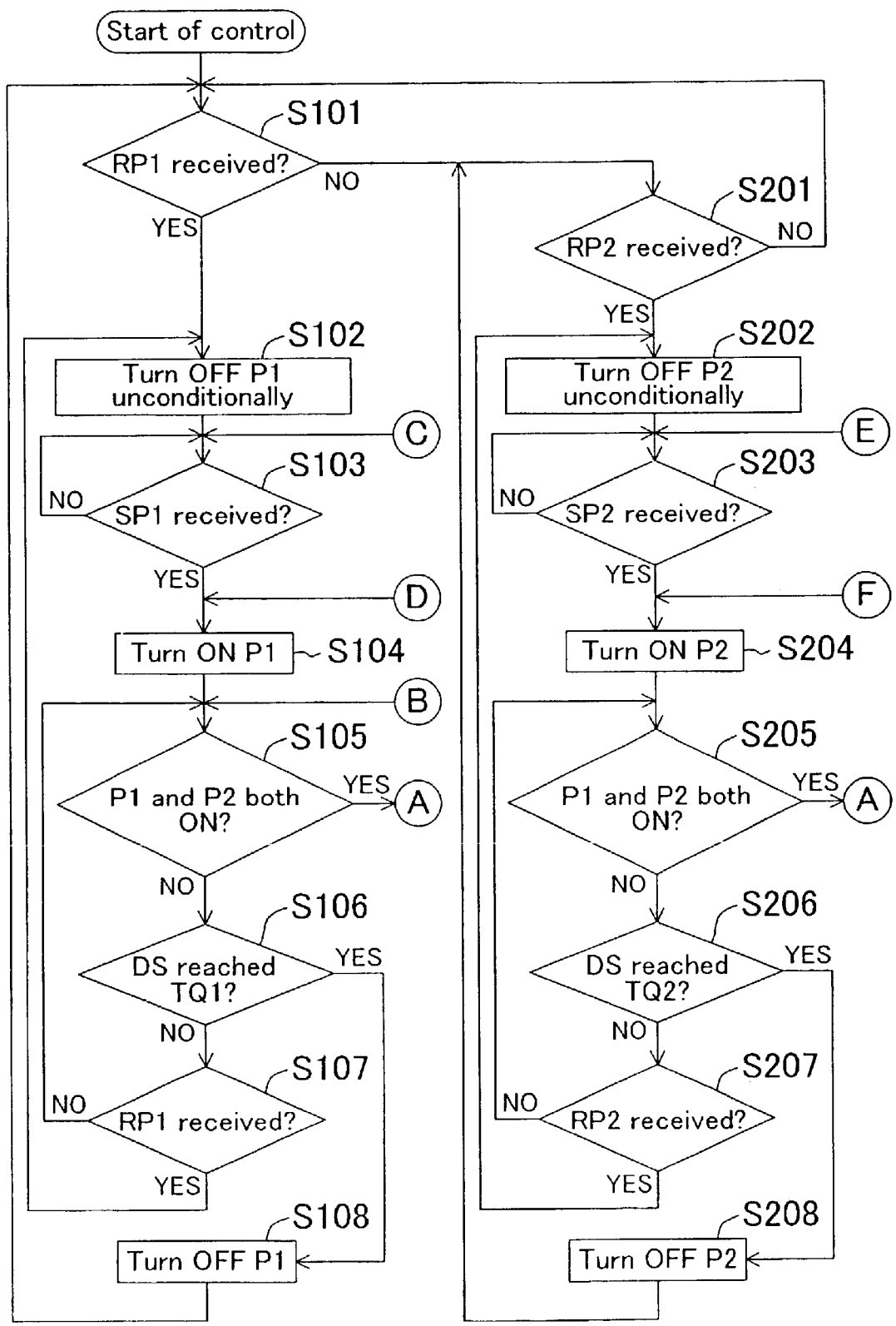
FIG. 4 is a flow chart for the motor driving device of FIG. 3.

The operation of the PWM control section 9A will now be described with reference to the flow chart of FIG. 4, with respect to the production of the PWM control signals P1 and P2 in the motor driving device of the present embodiment.

First, in step S101 after starting the control process for producing the PWM control signals P1 and P2, the PWM control section 9A determines the presence/absence of the reset pulse signal RP1 being received. If it is present, the process proceeds to step S102 for the process of producing the PWM control signal P1. Otherwise, the process proceeds to step S201.

In step S201, the presence/absence of the reset pulse signal RP2 being received is determined. If it is present, the process proceeds to step S202 for the process of producing the PWM control signal P2, and returns to step S101 otherwise.

When the reset pulse signal RP1 or RP2 is received, a similar process is performed for producing either the PWM control signal P1 or P2, as follows.

In step S102 (or S202), the PWM control section 9A unconditionally turns OFF the PWM control signal P1 (or P2). Then, the process proceeds to step S103 (or S203), and waits for the set pulse signal SP1 (or SP2) to be received. When the set pulse signal SP1 (or SP2) is received, the process proceeds to step S104 (or S204) to turn ON the PWM control signal P1 (or P2), thereby initiating the energization of a phase current aiming at the torque command signal TQ1 (or TQ2).

Then, in the following step S105 (or S205), it is determined whether or not the PWM control signals P1 and P2 are both ON. If they are both ON, the process proceeds to step S301 in FIG. 5 to perform two-phase simultaneous energization. If only the PWM control signal P1 (or P2) is ON, the process proceeds to step S106 (or S206).

In step S106 (or S206), it is determined, from the comparison result CR1 (or CR2), whether or not the level of the current detection signal DS has reached that of the torque command signal TQ1 (or TQ2). If the level of the current detection signal DS has reached that of the torque command signal TQ1 (or TQ2), the process proceeds to step S108 (or S208) to turn OFF the PWM control signal P1 (or P2). Otherwise, the process proceeds to step S107 (or S207).

In step S107 (or S207), it is determined whether or not the reset pulse signal RP1 (or RP2) is received during the energization aiming at the torque command signal TQ1 (or TQ2). If the reset pulse signal RP1 (or RP2) is received, the process returns to step S102 (or S202) to turn OFF the PWM control signal P1 (or P2). Otherwise, the process returns to step S105 (or S205) to determine whether or not to transition to two-phase simultaneous energization.

In step S108 (or S208), the PWM control signal P1 (or P2) is turned OFF. Thus, the energization of a phase current aiming at the torque command signal TQ1 (or TQ2), is once terminated. Then, the process returns to step S101 or S201 to repeat the steps described above.

Next, the operation of the masking section 8 and that of the PWM control section 9A will now be described with reference to the flow chart of FIG. 5, with respect to the production of the PWM control signals P1 and P2 when two phase are energized simultaneously.

First, in step S301 after the control transitions to two-phase simultaneous energization, the comparison results CR1 and CR2 are masked. The masking process is performed by the masking section 8. Then, in step S302, the masking section 8 determines whether or not the level of the current detection signal DS has reached that of the torque command signal TQ3. If the level of the current detection signal DS has reached that of the torque command signal TQ3, the process proceeds to step S305 to terminate the two-phase simultaneous energization. Otherwise, the process proceeds to step S303.

In step S303, the PWM control section 9A determines the presence/absence of the reset pulse signal RP1 being received. If it is present, the process proceeds to step S307. Otherwise, the process proceeds to step S304. Similarly, in step S304, the PWM control section 9A determines the presence/absence of the reset pulse signal RP2 being received. If it is present, the process proceeds to step S312. Otherwise, the process returns to step S302. While steps S302 to S304 are repeated, two phase are being energized simultaneously.

In step S305, the masking section 8 unmasks the comparison result CR2. Thus, the PWM control section 9A determines, from the comparison result CR2, that the level of the current detection signal DS has reached that of the torque command signal TQ2, thereby turning OFF the PWM control signal P2. As the PWM control signal P2 is turned OFF, the process exits the two-phase simultaneous energization. Then, the masking section 8 unmasks the comparison result CR1 in step S306. Thus, the two-phase simultaneous energization is terminated, and the process proceeds to step S105 in FIG. 4 to continue the production of the PWM control signal P1.

Also when the reset pulse signal RP1 or RP2 is received, the process exits the two-phase simultaneous energization as follows.

In step S303 (or S304), if the reset pulse signal RP1 (or RP2) is received, the process proceeds to step S307 (or step S312), and the PWM control section 9A unconditionally turns OFF the PWM control signal P1 (or P2). As the PWM control signal P1 (or P2) is turned OFF, the process exits the two-phase simultaneous energization. Then, in the following step S308 (or S313), the masking section 8 unmasks the comparison results CR1 and CR2. Thus, the two-phase simultaneous energization is terminated.

Then, the process proceeds to step S309 (or S314), and the PWM control section 9A determines, from the comparison result CR2 (or CR1), whether or not the level of the current detection signal DS has reached that of the torque command signal TQ2 (or TQ1). If the level of the current detection signal DS has reached that of the torque command signal TQ2 (or TQ1), the process proceeds to step S311 (or S316). Otherwise, the process proceeds to step S310 (or S315).

In step S310 (or S 135), the PWM control section 9A determines the presence/absence of the set pulse signal SP1 (or SP2) being received. If it is absent, the process returns to step S309 (or S314). Otherwise, the process proceeds to step S104 (or S204) in FIG. 4 to turn ON the PWM control signal P1 (or P2). Thus, two-phase simultaneous energization is initiated again.

In step S311 (or S316), the PWM control section 9A turns OFF the PWM control signal P2 (or P1). Thus, the two phases are both in a non-energized state. Then, the process proceeds to step S103 (or S203) in FIG. 4 to again turn ON the PWM control signal P1 (or P2) and initiate energization.

Figure 6A:
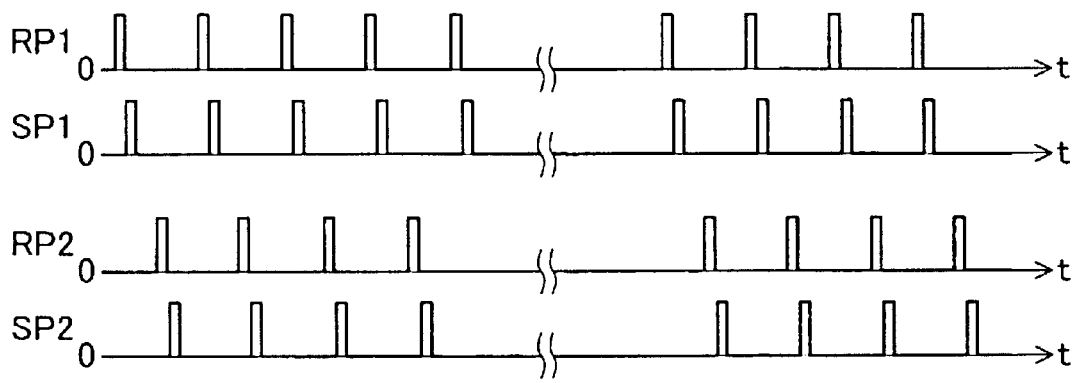
FIG. 6A to FIG. 6D are timing charts for the motor driving device of FIG. 3.
Figure 6B:
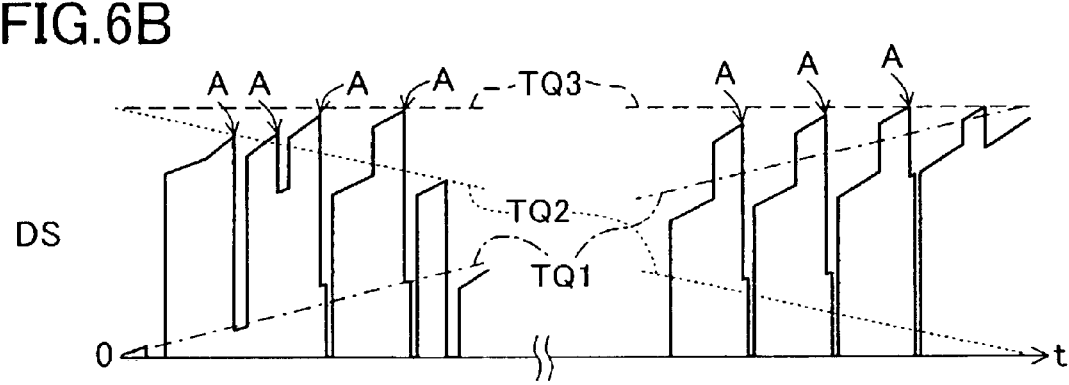
Figure 6C:
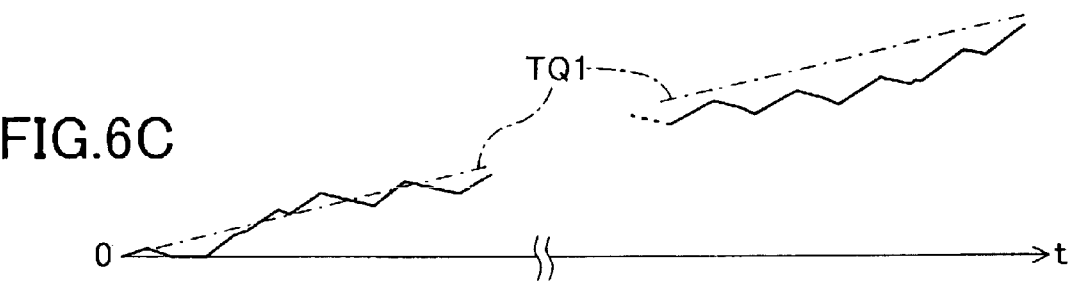
Figure 6D:
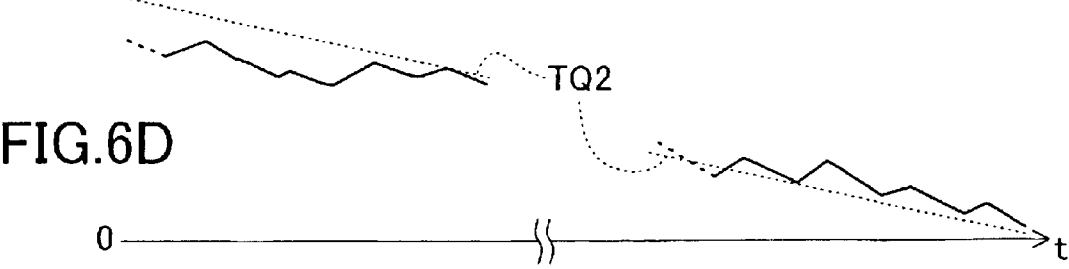

Energization through the motor coils based on the PWM control signals P1 and P2 produced by the process flow as described above will be described with reference to the timing charts of FIG. 6A to FIG. 6D. FIG. 6A illustrates the set pulse signals SP1 and SP2 and the reset pulse signals RP1 and RP2. FIG. 6B illustrates the current detection signal DS and the torque command signals TQ1 to TQ3. FIG. 6C illustrates a phase current being energized while aiming at the torque command signal TQ1, and FIG. 6D illustrates a phase current being energized while aiming at the torque command signal TQ2.

Upon receiving the reset pulse signal RP1 (or RP2) while two phase are being energized simultaneously, the PWM control signal P1 (or P2) is unconditionally turned OFF. Thus, the current detection signal DS represents the amount of current being energized by the PWM control signal P2 (or P1) that is remaining to be ON (portions indicated by "A" in FIG. 6B). Specifically, each time the reset pulse signal RP1 (or RP2) is received, the process exits the two-phase simultaneous energization so that the amount of current being applied to one phase can be detected by the current detection signal DS. As a result, it is possible to maintain the parallelism and the independence of the two phases being energized, and to energize two phases while aiming at the respective torque command signals TQ1 and TQ2, as illustrated in FIG. 6C and FIG. 6D.

As described above, according to the present embodiment, it is possible to avoid a situation where two-phase simultaneous energization continues for a long period of time by unconditionally turning OFF the PWM control signals P1 and P2 using the reset pulse signals RP1 and RP2. Thus, it is possible to maintain the parallelism and the independence of the two phases to be energized with PWM control, and to apply trapezoidal phase currents through motor coils while energizing the phase currents, aiming at the respective torque command signals TQ1 and TQ2. As a result, it is possible to suppress vibrations of the motor and to reduce noise from the motor.

Moreover, according to the present embodiment, even if energization is initiated erroneously due to noise, etc., a normal state can be recovered. For example, even if the PWM control section 9A receives the set pulse signal SP1 erroneously due to noise, etc., to turn ON the PWM control signal P1, thereby starting erroneous energization, the erroneous energization can be stopped as the PWM control section 9A receives the reset pulse signal RP1. Then, a normal control state can be recovered as a normal set pulse signal SP1 is received.

Note that while the reset pulse signals RP1 and RP2 are generated immediately before the set pulse signals SP1 and SP2, respectively, in the present embodiment, the present invention is not limited to this. For example, they may be generated after the passage of a predetermined amount of time from the generation of the set pulse signals SP1 and SP2, respectively. However, it is preferred that they are generated immediately before the set pulse signals SP1 and SP2, respectively, because it is then possible to maximize the ON periods of the PWM control signals P1 and P2.

Moreover, while the oscillation section 5A produces the set pulse signals SP1 and SP2 and the reset pulse signals RP1 and RP2 in the present embodiment, one or more of these signals may be produced by the PWM control section 9A.

Moreover, the pulse width of the reset pulse signals RP1 and RP2 may be different from that of the set pulse signals SP1 and SP2. While the reset pulse signal RP1 is being received, the PWM control signal P1 is unconditionally turned OFF so that it is possible to perform only the energization aiming at the torque command signal TQ2. Therefore, by increasing the pulse width of the reset pulse signal RP1, for example, it is possible to ensure a long period during which only the PWM control signal P2 is controlled. Thus, it is possible to eliminate problems that occur when two-phase simultaneous energization continues for a long period of time, and to maintain the parallelism and the independence of the two phases to be energized with PWM control.

Figure 5:
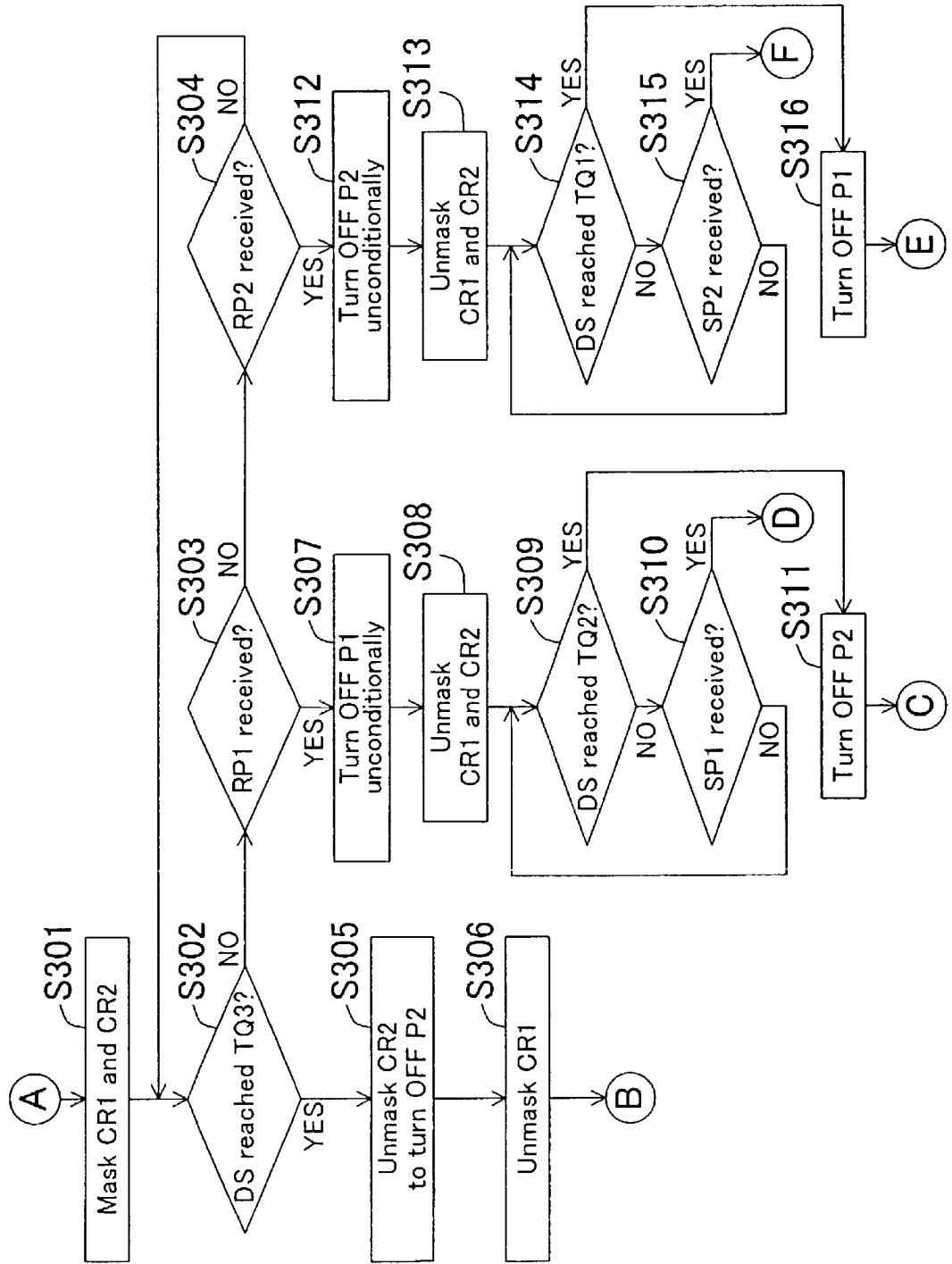
FIG. 5 is a flow chart for the motor driving device of FIG. 3.

Moreover, while the PWM control signal P2 is turned OFF first in step S305 in FIG. 5 when exiting the two-phase simultaneous energization, the same effect as that of the present embodiment can be obtained also when the PWM control signal P1 is turned OFF first. In such a case, the process may return to step S205 in FIG. 4 after unmasking the comparison result CR1 in step S305, and then unmasking the comparison result CR2 in the following step S306.

Third Embodiment

In the motor driving device of the second embodiment, some of the electric energy of the two-phase simultaneous energization may still remain in the amplifier A of FIG. 3 immediately after the PWM control signal P1 (or P2) is unconditionally turned OFF in step S307 (or S312) in FIG. 5. In such a case, if the comparison results CR1 and CR2 are unmasked in step S308 (or S313), the PWM control section 9A detects, from the comparison result CR2 (or CR1), that the level of the current detection signal DS has reached that of the torque command signal TQ2 (or TQ1) in the following step S310 (or S315). As a result, the PWM control signal P2 (or P1) is also turned OFF, whereby the energizations of the two phases are both terminated. Thereafter, even if the set pulse signal SP1 (or SP2) is received, only one phase will be energized as the PWM control signal P1 (or P2) is turned ON, and the process will not return to the two-phase simultaneous energization. The third embodiment of the present invention is to solve this problem.

Figure 7:
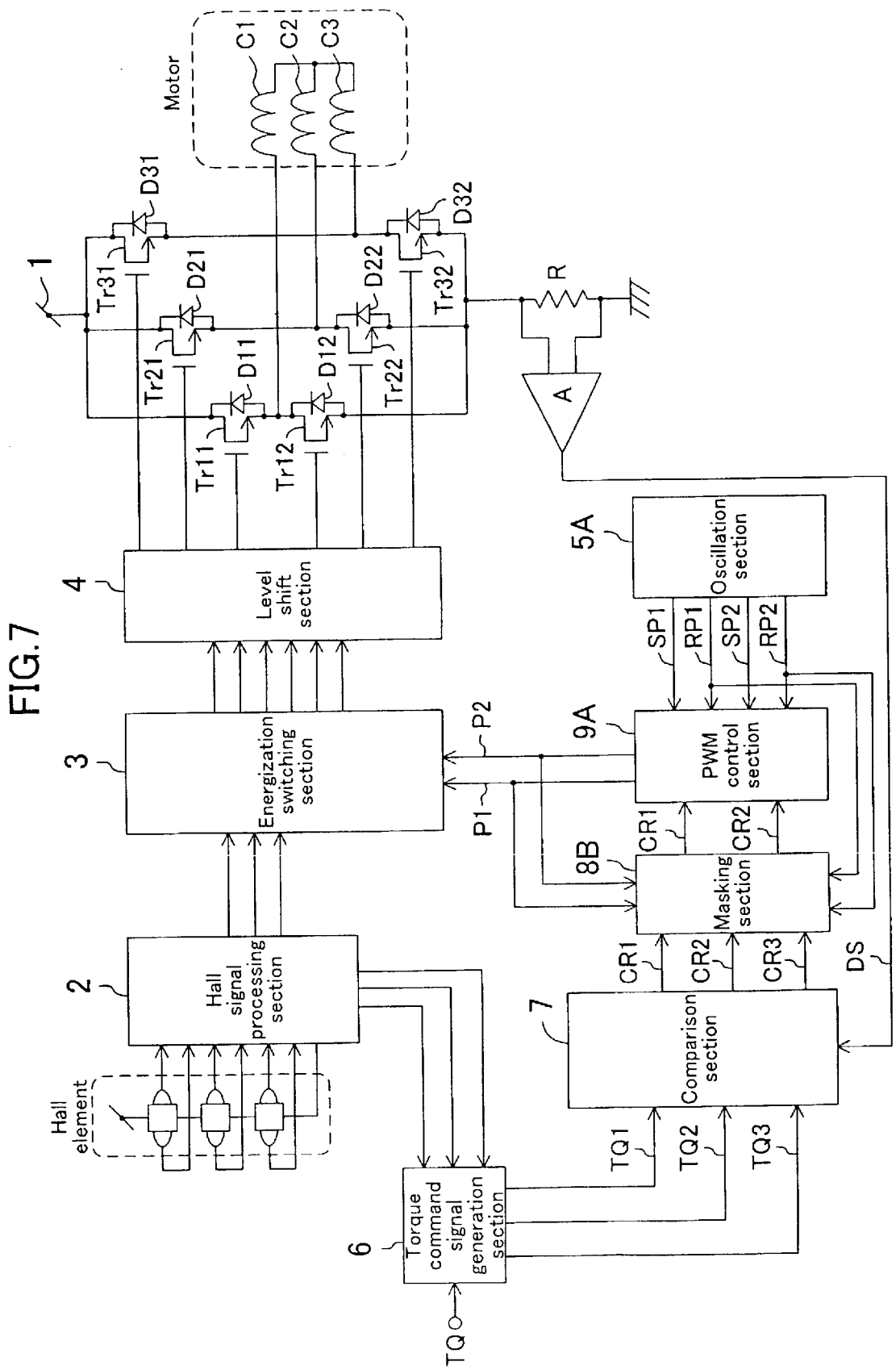
FIG. 7 is a diagram illustrating a configuration of a motor driving device according to a third embodiment of the present invention.

FIG. 7 illustrates a configuration of a motor driving device according to the present embodiment. The motor driving device of the present embodiment includes a masking section 8B having a different configuration from that of the masking section 8 in the motor driving device of the second embodiment illustrated in FIG. 3. Other than this, the elements of the motor driving device of the present embodiment are similar to those of the motor driving device of the second embodiment, and thus will not be further described below.

The masking section 8B receives the reset pulse signals RP1 and RP2, in addition to the comparison results CR1 to CR3 and the PWM control signals P1 and P2. According to the reset pulse signal RP1, the masking section 8B unmasks the comparison result CR1, but keeps the comparison result CR2 masked for period tm2, after which the comparison result CR2 is unmasked. Similarly, according to the reset pulse signal RP2, the masking section 8B unmasks the comparison result CR2, but keeps the comparison result CR1 masked for period tm2, after which the comparison result CR1 is unmasked.

The process flow of the production of the PWM control signals P1 and P2 by the motor driving device of the present embodiment including the masking section 8B is substantially the same as that of the second embodiment, and thus will not be further described below. The difference from the second embodiment will now be described.

In the present embodiment, in step S307 (or S312) in FIG. 5, the PWM control section 9A unconditionally turns OFF the PWM control signal P1 (or P2), and the masking section 8B unmasks only the comparison result CR1 (or CR2). Since the comparison result CR2 (or CR1) is kept masked, it is possible to prevent the motor from operating erroneously by comparing the current detection signal DS, which is obtained by detecting the electric energy remaining in the amplifier A of FIG. 7, with the torque command signal TQ2 in step S309 (or S314).

In step S308 (or S313), the masking section 8B unmasks the comparison result CR2 after the passage of period tm2. By this time, the current detection signal DS represents a current value according to the PWM control signal P2 (or P1) being ON. Thus, it is possible to prevent the PWM control signal P2 (or P1) from being turned OFF unconditionally.

Figure 8A:
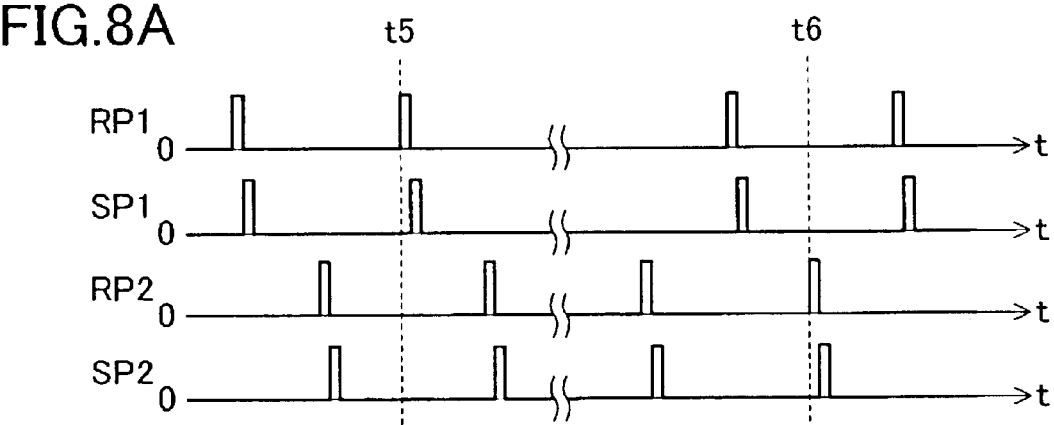
FIG. 8A and FIG. 8B are timing charts for the motor driving device of FIG. 7.
Figure 8B:
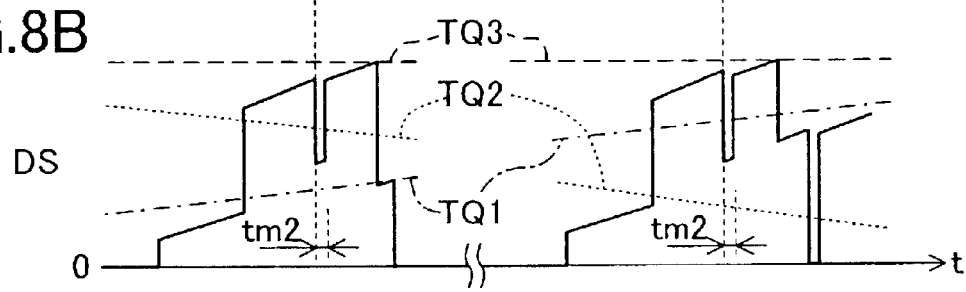

How two-phase simultaneous energization is performed by the motor driving device having such a configuration will now be described with reference to the timing charts of FIG. 8A and FIG. 8B. FIG. 8A illustrates the reset pulse signals RP1 and RP2 and the set pulse signals SP1 and SP2. FIG. 8B illustrates the current detection signal DS and the torque command signals TQ1 to TQ3.

Immediately before time t5, the PWM control signals P1 and P2 are both ON, and the current detection signal DS at this point represents the amount of current being applied to the two phases. Then, at time t5, the PWM control section 9A receives the reset pulse signal RP1, thereby unconditionally turning OFF the PWM control signal P1. At the same time, the masking section 8B also receives the reset pulse signal RP1, thereby unmasking the comparison result CR1 while maintaining the comparison result CR2 for period tm2.

During period tm2, the PWM control section 9A can keep the PWM control signal P2 ON, irrespective of the comparison result CR2. Then, after the passage of period tm2, when the current detection signal DS can properly represent the amount of current that is supplied with the PWM control signal P2 being ON, the process of step S309 in FIG. 5 is performed. Thus, two-phase simultaneous energization can be initiated again.

Similarly, immediately before time t6, the PWM control signals P1 and P2 are both ON, and the current detection signal DS at this point represents the total amount of current for the two phases being energized. Then, at time t6, the PWM control section 9A receives the reset pulse signal RP2 to unconditionally turn OFF the PWM control signal P2. At the same time, the masking section SB also receives the reset pulse signal RP2 to unmask the comparison result CR2 while keeping the comparison result CR1 masked for period tm2.

During period tm2, the PWM control section 9A can keep the PWM control signal P1 ON, irrespective of the comparison result CR1. Then, after the passage of period tm2, when the current detection signal DS can properly represent the amount of current that is supplied with the PWM control signal P1 being ON, the process of step S314 in FIG. 5 is performed. Thus, two-phase simultaneous energization can be initiated again.

As described above, according to the present embodiment, it is possible to avoid a situation where two-phase simultaneous energization continues for a long period of time, and the two-phase simultaneous energization can be initiated again after it is once terminated, whereby it is possible to supply a sufficient electric power to the motor while maintaining the parallelism and the independence of the two energized phases. Thus, it is possible to suppress vibrations of the motor and to reduce noise from the motor, and to realize a sufficient torque that is increased while aiming at the torque command.

Note that while only the comparison result CR1 (or CR2) is unmasked in step S307 (or S312) in FIG. 5 in the present embodiment, the present invention is not limited to this. Since the PWM control section 9A unconditionally turns OFF the PWM control signal P1 (or P2), irrespective of the comparison result CR1 (or CR2), in step S307 (or S312) in FIG. 5, the comparison result CR1 (or CR2) may be kept masked for period tm2 as is the comparison result CR2 (or CR1).

Moreover, period tm2 may be of any suitable length as long as the process can transition from two-phase simultaneous energization to one-phase energization by unconditionally turning OFF the PWM control signal P1 (or P2), and the level of the current detection signal DS reflects the energization of only one phase. Therefore, tm2 is preferably about on the order of 100 ns.

Fourth Embodiment

Figure 9:
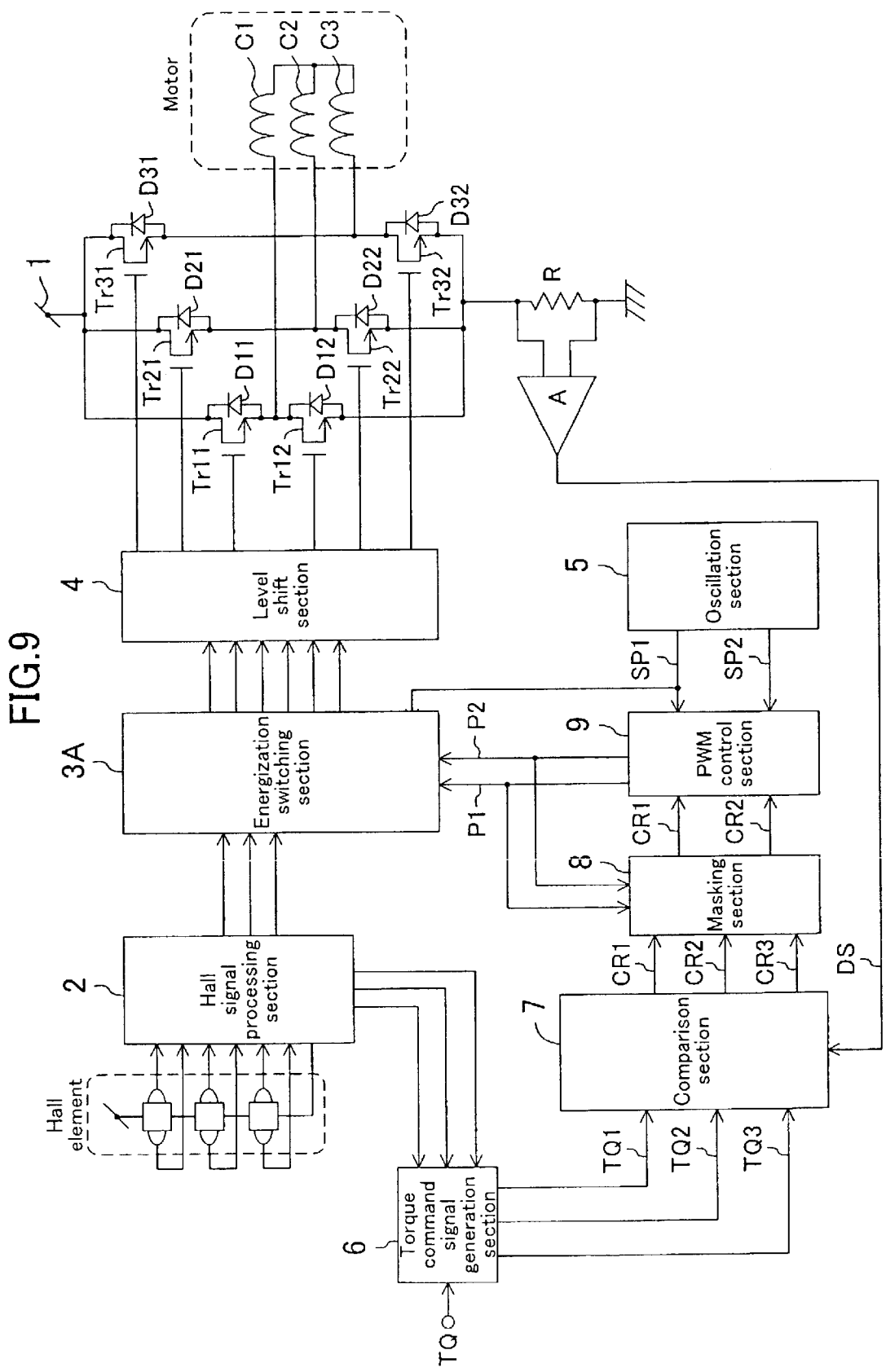
FIG. 9 is a diagram illustrating a configuration of a motor driving device according to a fourth embodiment of the present invention.

FIG. 9 illustrates a configuration of a motor driving device according to the fourth embodiment of the present invention. The motor driving device of the present embodiment includes an energization switching section 3A having a different configuration from that of the energization switching section 3 in the motor driving device of FIG. 13. Other than this, the elements of the motor driving device of the present embodiment are similar to those of the motor driving device of FIG. 13, and thus will not be further described below.

Upon receiving the set pulse signal SP1, the energization switching section 3A switches the energized phases so that the start of a cycle at which the energized phases are switched, i.e., the block starting point, coincides with the timing at which the set pulse signal SP1 is turned ON. How the motor coils are energized by the motor driving device of the present embodiment including the energization switching section 3A will now be described with reference to the drawings.

Figure 10A:
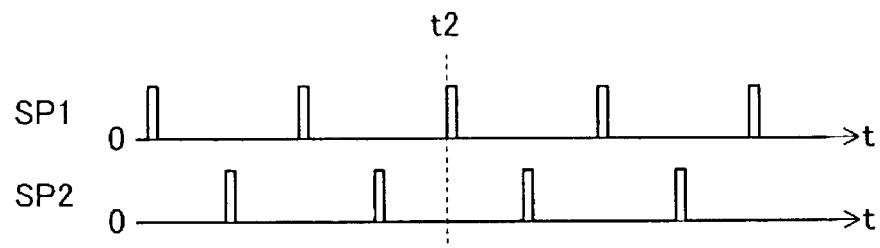
FIG. 10A to FIG. 10E are timing charts for the motor driving device of FIG. 9.
Figure 10B:
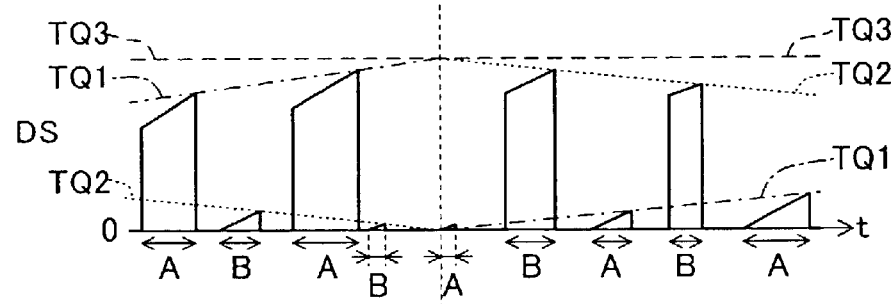
Figure 10C:
Figure 10D:
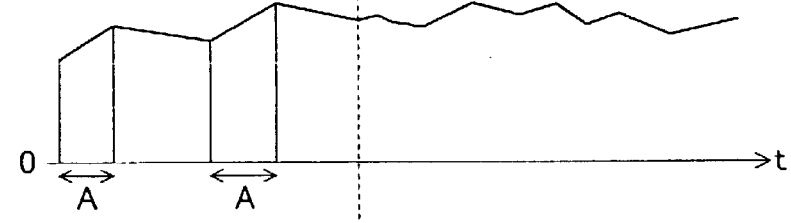
Figure 10E:
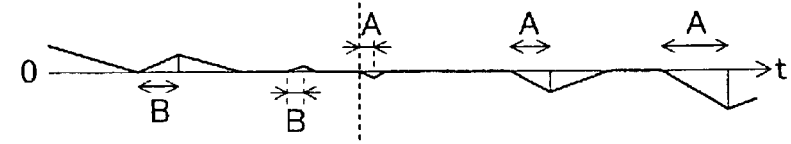

FIG. 10A to FIG. 10E are timing charts illustrating a portion of FIG. 14A to FIG. 14D around time t2 in an enlarged manner. Time t2 is a time at which the energized phases are switched by the energization switching section 3A. FIG. 10A illustrates the set pulse signals SP1 and SP2. FIG. 10B illustrates the current detection signal DS and the torque command signals TQ1 to TQ3. FIG. 10C, FIG. 10D and FIG. 10E illustrate the U-phase current, the V-phase current and the W-phase current, respectively. Note that "period A" and "period B" in FIG. 10B to FIG. 10E denote periods in which the PWM control signals P1 and P2, respectively, are turned ON to energize the respective phases.

Upon receiving the set pulse signal SP1, the energization switching section 3A determines the block starting point so that it coincides with the timing at which the set pulse signal SP1 is turned ON. Thus, as the energized phases are switched at a cycle of a period corresponding to 60 electrical degrees in a cycle of a phase current, the PWM control signal P1 can be turned ON quickly to initiate the energization aiming at the torque command signal TQ1.

As described above, according to the present embodiment, it is possible to eliminate a distortion in a phase current occurring immediately after the energized phases are switched. Thus, it is possible to suppress vibrations of the motor and to reduce noise from the motor.

Note that while the energization switching section 3A receives the set pulse signal SP1 in the present embodiment, it may alternatively receive the set pulse signal SP2, or the oscillation section 5 may be replaced with the oscillation section 5A of the second embodiment so that the energization switching section 3A receives the reset pulse signal RP1 or RP2 produced by the oscillation section 5A. In any case, similar effects to those of the present embodiment can be obtained.

Fifth Embodiment

Figure 11:
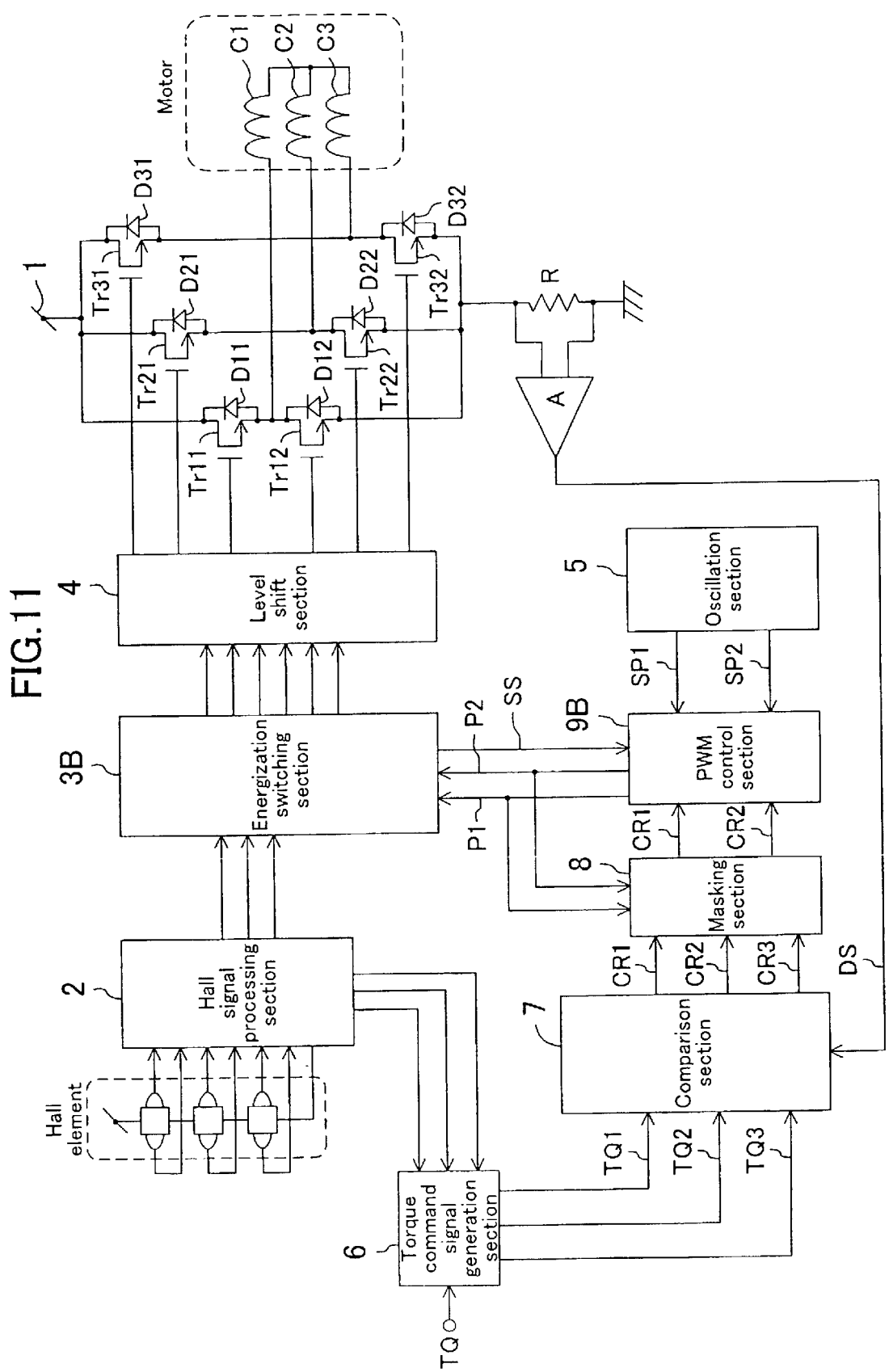
FIG. 11 is a diagram illustrating a configuration of a motor driving device according to a fifth embodiment of the present invention.
Figure 15A:
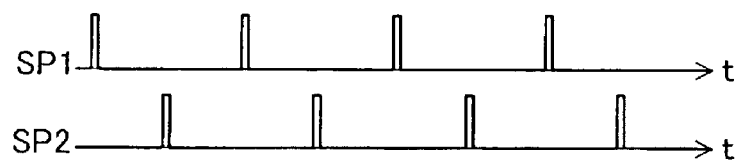
FIG. 15A to FIG. 15E are timing charts for a low-torque driving operation by the motor driving device of FIG. 13.
Figure 15B:
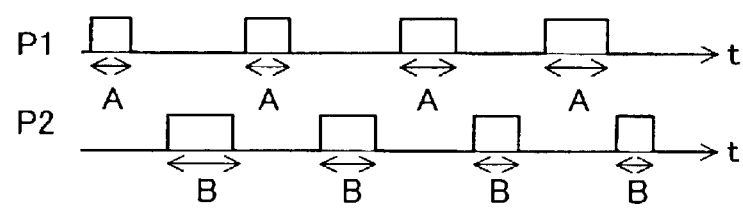
Figure 15C:
Figure 15D:
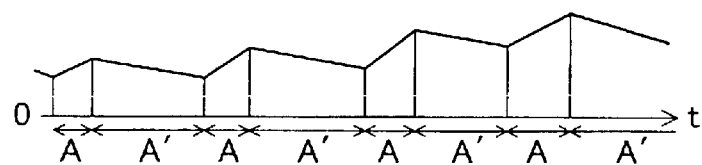
Figure 15E:
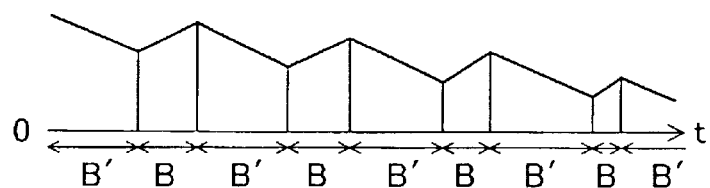
Figure 16A:
FIG. 16A to FIG. 16E are timing charts for a high-torque driving operation by the motor driving device of FIG. 13.
Figure 16B:
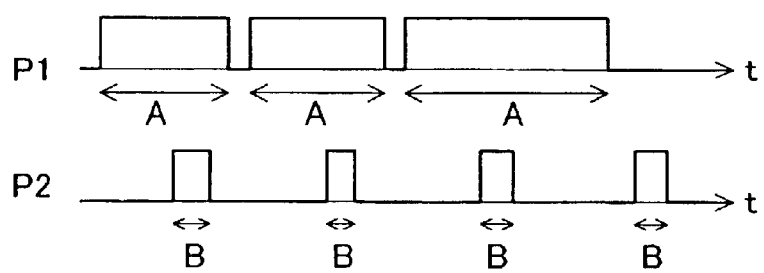
Figure 16C:
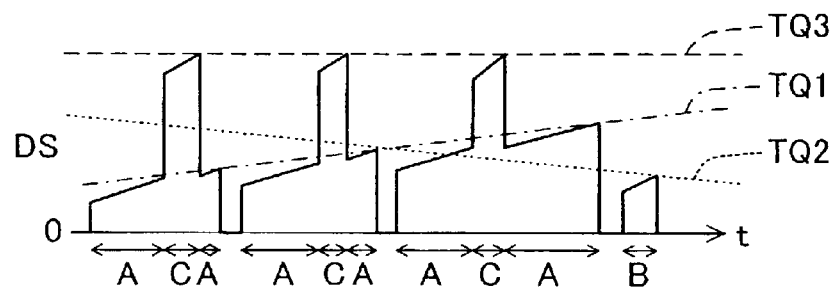
Figure 16D:
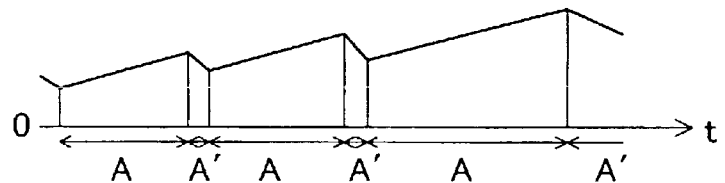
Figure 16E:
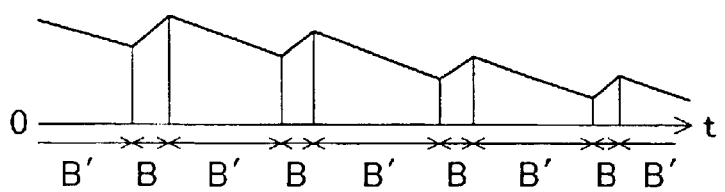
Figure 17A:
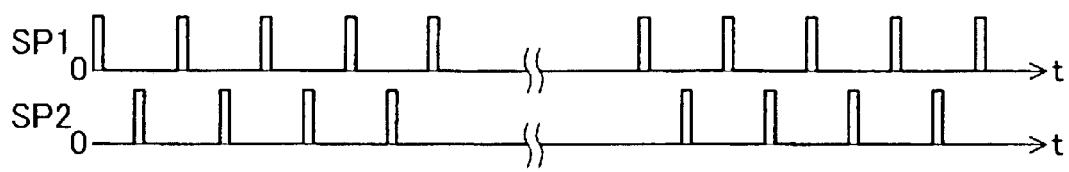
FIG. 17A to FIG. 17D illustrate how an abnormal phase current occurs in the motor driving device of FIG. 13.
Figure 17B:
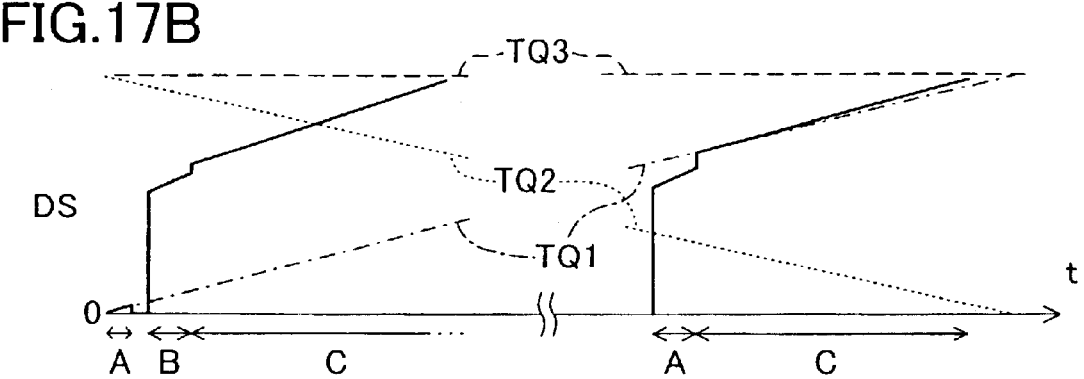
Figure 17C:
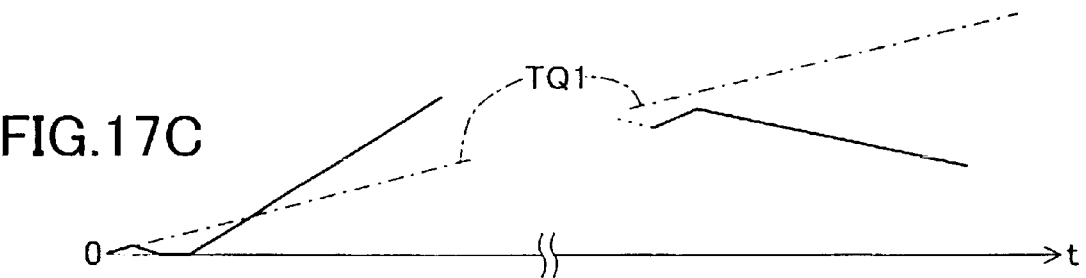
Figure 17D:
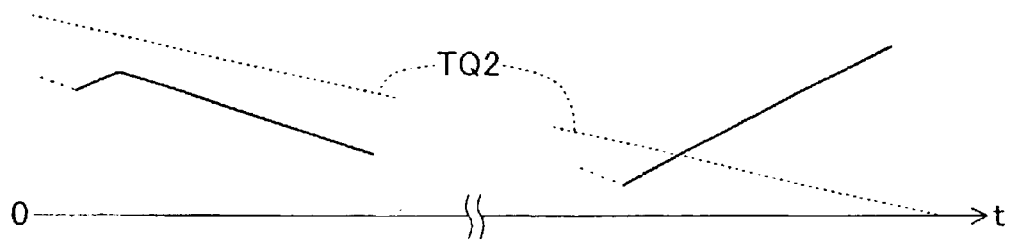
Figure 18A:
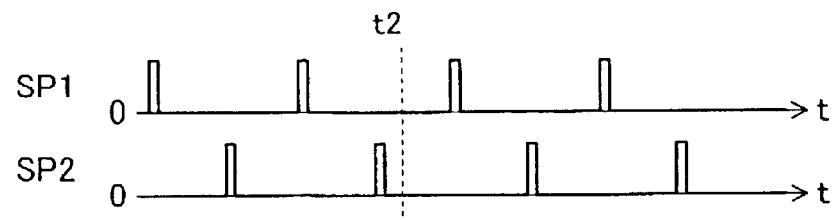
Figure 18B:
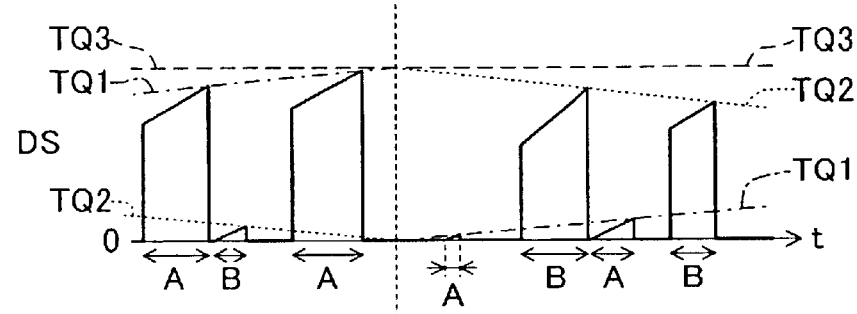
Figure 18D:
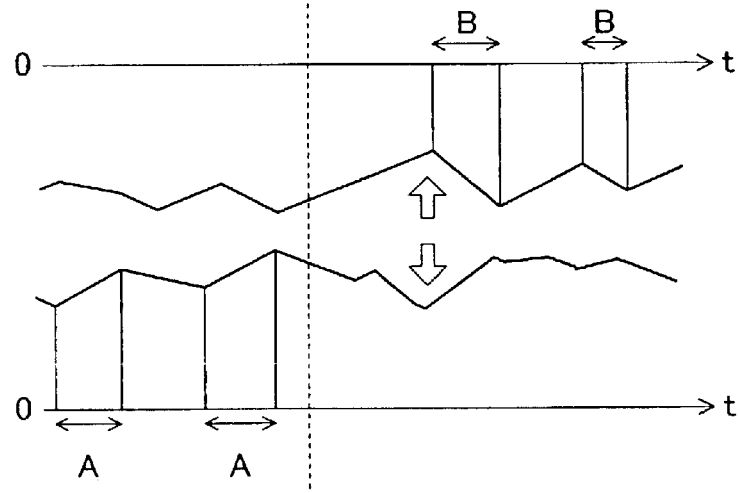
Figure 18E:
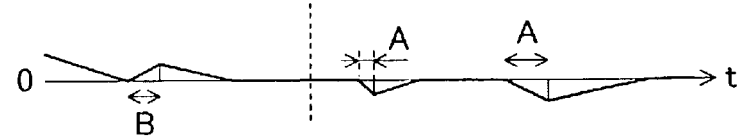

FIG. 11 illustrates a configuration of a motor driving device according to the fifth embodiment of the present invention. The motor driving device of the present embodiment includes an energization switching section 3B having a different configuration from that of the energization switching section 3 in the motor driving device of FIG. 13, and a PWM control section 9B having a different configuration from that of the PWM control section 9. Other than this, the elements of the motor driving device of the present embodiment are similar to those of the motor driving device of FIG. 13, and thus will not be further described below.

The energization switching section 3B produces and outputs a block signal SS to the PWM control section 9B. The block signal SS is a signal that represents the start of the energized-phase-switching cycle, i.e., a cycle of a period corresponding to 60 electrical degrees in a cycle of a phase current. Moreover, the PWM control section 9B turns ON the PWM control signal P1 according to the block signal SS, in addition to turning ON the PWM control signal P1 according to the set pulse signal SP1.

FIG. 12A to FIG. 12F are timing charts illustrating a portion of FIG. 14A to FIG. 14D around time t2 in an enlarged manner. Time t2 is a time at which the energized phases are switched by the energization switching section 3B. FIG. 12A illustrates the set pulse signals SP1 and SP2. FIG. 12B illustrates the current detection signal DS and the torque command signals TQ1 to TQ3. FIG. 12C illustrates the block signal SS. FIG. 12D, FIG. 12E and FIG. 12F illustrate the U-phase current, the V-phase current and the W-phase current, respectively. Note that "period A" and "period B" in FIG. 12B and FIG. 12D to FIG. 12F denote periods in which the PWM control signals P1 and P2, respectively, are turned ON to energize the respective phases.

The energization switching section 3B outputs the block signal SS at the start of the energized-phase-switching cycle, i.e., at time t2 (see FIG. 12C). The PWM control section 9B turns ON the PWM control signal P1 according to the block signal SS. Thus, new energized phases are determined, after which energization of the U phase aiming at the torque command signal TQ1 is initiated quickly.

As described above, according to the present embodiment, it is possible to eliminate a distortion in a phase current occurring immediately after the energized phases are switched. Thus, it is possible to suppress vibrations of the motor and to reduce noise from the motor.

Note that the PWM control section 9B may turn OFF the PWM control signal P2, while turning ON the PWM control signal P1, according to the block signal SS. Thus, it is possible to prevent an erroneous phase current from being energized immediately after the energized phases are switched, and thus to reduce noise from the motor. Alternatively, the PWM control section 9B may turn OFF the PWM control signal P1, while turning ON the PWM control signal P2.

As described above, according to the present invention, when the motor is driven at a high torque, it is ensured that two phases are energized simultaneously, whereby it is possible to supply the motor with a sufficient electric power that is increased while aiming at the torque command. Moreover, it is possible to avoid a situation where two-phase simultaneous energization continues for a long period of time, and to maintain the parallelism and the independence of the two phases being energized. Furthermore, it is possible to eliminate a distortion in a phase current. As a result, it is possible to suppress vibrations of the motor and to reduce noise from the motor.

What is claimed is:

1. A motor driving device for driving a motor by energizing motor coils with PWM control, the motor driving device comprising:

an energization switching section for determining a first energized phase and a second energized phase to be PWM-controlled, the determination being made at a predetermined cycle;

a torque command signal generation section that receives an original torque command signal for producing a first torque command signal and a second torque command signal each having an amplitude according to the original torque command signal, and also producing a third torque command signal, which is obtained by synthesizing the first and second torque command signals together;

a comparison section that receives the first to third torque command signals and a current detection signal, which is obtained by detecting a current being supplied to the motor, for comparing the current detection signal with the first to third torque command signals to output a first comparison result, a second comparison result, and a third comparison result, respectively;

an oscillation section for producing a first set pulse signal and a second set pulse signal;

a PWM control section that receives the first and second set pulse signals and the first and second comparison results for producing a first PWM control signal that is turned ON according to the first set pulse signal and turned OFF according to the first comparison result, and also producing a second PWM control signal that is turned ON according to the second set pulse signal and turned OFF according to the second comparison result; and a masking section that receives the first and second PWM control signals and the first to third comparison results for selectively masking or not masking the first and second comparison results according to the first and second PWM control signals and the third comparison result, wherein:
the masking section receives the first and second set pulse signals so as to mask the first comparison result according to the first set pulse signal and mask the second comparison result according to the second set pulse signal; and
the motor driving device energizes the first and second energized phases with PWM control in parallel according respectively to the first and second PWM control signals.

2. A motor driving device for driving a motor by energizing motor coils with PWM control, the motor driving device comprising:
an energization switching section for determining a first energized phase and a second energized phase to be PWM-controlled, the determination being made at a predetermined cycle;
a torque command signal generation section that receives an original torque command signal for producing a first torque command signal and a second torque command signal each having an amplitude according to the original torque command signal, and also producing a third torque command signal, which is obtained by synthesizing the first and second torque command signals together;
a comparison section that receives the first to third torque command signals and a current detection signal, which is obtained by detecting a current being supplied to the motor, for comparing the current detection signal with the first to third torque command signals to output a first comparison result, a second comparison result, and a third comparison result, respectively;
an oscillation section for producing a first set pulse signal and a second set pulse signal;
a PWM control section that receives the first and second set pulse signals and the first and second comparison results for producing a first PWM control signal that is turned ON according to the first set pulse signal and turned OFF according to the first comparison result, and also producing a second PWM control signal that is turned ON according to the second set pulse signal and turned OFF according to the second comparison result; and
a masking section that receives the first and second PWM control signals and the first to third comparison results for selectively masking or not masking the first and second comparison results according to the first and second PWM control signals and the third comparison result, wherein:
the PWM control section receives a first reset pulse signal and a second reset pulse signal, which are externally provided or internally produced, for turning OFF the first PWM control signal according to the first reset pulse signal and turning OFF the second PWM control signal according to the second reset pulse signal; and
the motor driving device energizes the first and second energized phases with PWM control in parallel according respectively to the first and second PWM control signals.

3. The motor driving device of claim 2, wherein:
the masking section masks the first and second comparison results during a period in which the first and second PWM control signals are both ON; and
during said period, the second comparison result is kept masked for a predetermined period of time and then unmasked according to the first reset pulse signal, and the first comparison result is kept masked for a predetermined period of time and then unmasked according to the second reset pulse signal.

4. A motor driving device for driving a motor by energizing motor coils with PWM control, the motor driving device comprising:
an energization switching section for determining a first energized phase and a second energized phase to be PWM-controlled, the determination being made at a predetermined cycle;
a torque command signal generation section that receives an original torque command signal for producing a first torque command signal and a second torque command signal each having an amplitude according to the original torque command signal;
a comparison section that receives the first and second torque command signals and a current detection signal, which is obtained by detecting a current being supplied to the motor, for comparing the current detection signal with the first and second torque command signals to output a first comparison result and a second comparison result, respectively;
an oscillation section for producing a first set pulse signal and a second set pulse signal; and
a PWM control section that receives the first and second set pulse signals and the first and second comparison results for producing a first PWM control signal that is turned ON according to the first set pulse signal and turned OFF according to the first comparison result, and also producing a second PWM control signal that is turned ON according to the second set pulse signal and turned OFF according to the second comparison result,
wherein the first and second energized phases are energized with PWM control in parallel according respectively to the first and second PWM control signals so that a start of the predetermined cycle coincides with a timing at which the first or second PWM control signal is turned ON.

5. The motor driving device of claim 4, wherein the energization switching section receives the first or second set pulse signal for making the start of the predetermined cycle coincide with a timing at which the first or second set pulse signal is turned ON.

6. The motor driving device of claim 4, wherein:
the energization switching section produces a signal indicating a start of the predetermined cycle; and
the PWM control section receives the signal indicating the start of the predetermined cycle for turning ON the first or second PWM control signal according to the signal indicating the start of the predetermined cycle.

7. A motor driving method for driving a motor by energizing motor coils with PWM control, the motor driving method comprising:
an energization switching step of determining a first energized phase and a second energized phase to be PWM-controlled, the determination being made at a predetermined cycle;
a torque command signal generation step of producing a first torque command signal and a second torque com mand signal each having an amplitude according to a given original torque command signal, and also producing a third torque command signal, which is obtained by synthesizing the first and second torque command signals together;

a comparison step of comparing a current detection signal, which is obtained by detecting a current being supplied to the motor, with the first to third torque command signals;

a PWM control step of producing a first PWM control signal and a second PWM control signal according to a given first set pulse signal, a given second set pulse signal and comparison results from the comparison step; and a masking step of selectively masking or not masking the comparison results based on the first and second PWM control signals and the comparison result from the comparison step, wherein:

the PWM control step uses a given first reset pulse signal and a given second reset pulse signal for turning OFF the first PWM control signal according to the first reset pulse signal and turning OFF the second PWM control signal according to the second reset pulse signal; and the motor driving method energizes the first and second energized phases with PWM control in parallel according respectively to the first and second PWM control signals.

8. A motor driving method for driving a motor by energizing motor coils with PWM control, the motor driving method comprising:

an energization switching step of determining a first energized phase and a second energized phase to be PWM-controlled, the determination being made at a predetermined cycle;

a torque command signal generation step of producing a first torque command signal and a second torque command signal each having an amplitude according to a given original torque command signal;

a comparison step of comparing a current detection signal, which is obtained by detecting a current being supplied to the motor, with the first and second torque command signals; and a PWM control step of producing a first PWM control signal and a second PWM control signal according to a given first set pulse signal, a given second set pulse signal and comparison results from the comparison step, wherein the first and second energized phases are energized with PWM control in parallel according respectively to the first and second PWM control signals so that a start of the predetermined cycle coincides with a timing at which the first or second PWM control signal is turned ON.

* * * * *